(12) United States Patent
Nagatoshi et al.

(10) Patent No.: US 11,125,987 B2
(45) Date of Patent: Sep. 21, 2021

(54) IMAGING OPTICAL SYSTEM, PROJECTION DISPLAY DEVICE, AND IMAGING APPARATUS

(71) Applicant: FUJIFILM Corporation, Tokyo (JP)

(72) Inventors: Yukiko Nagatoshi, Saitama (JP); Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 294 days.

(21) Appl. No.: 16/366,314

(22) Filed: Mar. 27, 2019

(65) Prior Publication Data
US 2019/0306390 A1 Oct. 3, 2019

(30) Foreign Application Priority Data

Mar. 28, 2018 (JP) .............................. JP2018-062315

(51) Int. Cl.
| | | |
|---|---|---|
| *G02B 15/22* | (2006.01) | |
| *G02B 15/24* | (2006.01) | |
| *G02B 15/167* | (2006.01) | |
| *G02B 15/14* | (2006.01) | |
| *G03B 21/14* | (2006.01) | |
| *H04N 5/225* | (2006.01) | |
| *H04N 5/232* | (2006.01) | |

(Continued)

(52) U.S. Cl.
CPC ............. *G02B 15/22* (2013.01); *G02B 15/14* (2013.01); *G02B 15/167* (2013.01); *G02B 15/24* (2013.01); *G03B 21/142* (2013.01); *G02B 13/16* (2013.01); *G03B 2205/0046* (2013.01); *H04N 5/2254* (2013.01); *H04N 5/23212* (2013.01); *H04N 5/23296* (2013.01); *H04N 9/3197* (2013.01)

(58) Field of Classification Search
CPC .... G02B 15/14; G02B 15/167; G02B 15/163; G02B 15/11; G02B 13/0065
See application file for complete search history.

(56) References Cited

U.S. PATENT DOCUMENTS

| | | | |
|---|---|---|---|
| 10,816,777 B2 | 10/2020 | Amano | |
| 2004/0021953 A1* | 2/2004 | Betensky | ............... G02B 15/12 359/691 |

(Continued)

FOREIGN PATENT DOCUMENTS

| | | |
|---|---|---|
| JP | 2015-152764 A | 8/2015 |
| JP | 2017-126036 A | 7/2017 |

(Continued)

OTHER PUBLICATIONS

An Office Action; "Notice of Reasons for Refusal", mailed by the Japanese Patent Office dated Jan. 5, 2021, which corresponds to Japanese Patent Application No. 2018-062315 and is related to U.S. Appl. No. 16/366,314; with English language translation.

*Primary Examiner* — Robert E. Tallman
(74) *Attorney, Agent, or Firm* — Studebaker & Brackett PC

(57) ABSTRACT

An imaging optical system consists of, in order from a magnification side: a first optical system that forms an intermediate image on a position conjugate to a magnification side imaging surface; and a second optical system that re-forms the intermediate image on a reduction side imaging surface. The first optical system includes at least two focusing lens groups that move with different loci during focusing. The imaging optical system satisfies predetermined conditional expressions relating to the focusing lens groups.

13 Claims, 19 Drawing Sheets

EXAMPLE 1
WIDE-ANGLE END

(51) Int. Cl.
  *H04N 9/31* (2006.01)
  *G02B 13/16* (2006.01)

(56) References Cited

U.S. PATENT DOCUMENTS

2015/0234157 A1    8/2015  Ichimura
2016/0246037 A1*   8/2016  Amano .................. G02B 13/22

FOREIGN PATENT DOCUMENTS

JP    2017-211480 A    11/2017
JP    2017-215503 A    12/2017

* cited by examiner

EXAMPLE 1

EXAMPLE 2

EXAMPLE 4

EXAMPLE 4

EXAMPLE 5

EXAMPLE 5

EXAMPLE 6

EXAMPLE 6

IMAGING OPTICAL SYSTEM, PROJECTION DISPLAY DEVICE, AND IMAGING APPARATUS

CROSS REFERENCE TO RELATED APPLICATIONS

The present application claims priority under 35 U.S.C. § 119 to Japanese Patent Application No. 2018-062315 filed on Mar. 28, 2018. The above application is hereby expressly incorporated by reference, in its entirety, into the present application.

BACKGROUND OF THE INVENTION

1. Field of the Invention

The present invention relates to an imaging optical system forming an intermediate image, a projection display device comprising the imaging optical system, and an imaging apparatus comprising the imaging optical system.

2. Description of the Related Art

In the past, projection display devices, each of which uses a light valve such as a liquid crystal display element or a digital micromirror device (DMD: registered trademark) display element, have come into widespread use.

Favorable optical aberration correction appropriate for the resolution of the light valve is required for the imaging optical system used in this type of the projection display devices.

In addition, there has been an increase in the demand to mount an imaging optical system on a projection display device. The imaging optical system has a high optical performance in which various aberrations are satisfactorily corrected while having a wide angle in consideration of an increase in degree of freedom in setting the distance to a screen.

An imaging optical system, which forms an intermediate image at a position conjugate to the reduction side imaging surface and re-forms the intermediate image on the magnification side imaging surface, has been proposed so as to cope with such demands (for example, JP2017-215503A).

SUMMARY OF THE INVENTION

However, the lens of JP2017-215503A has large fluctuation in distortion during focusing, and a large change in performance in a case where the projection distance is changed. Therefore, there is a problem that it is difficult to ensure a wide focusing range.

The present invention has been made in consideration of the above-mentioned situations, and its object is to provide an imaging optical system having a wide angle and a small change in performance in a case where a projection distance is changed, a projection display device having the imaging optical system, and an imaging apparatus having the imaging optical system.

An imaging optical system of the present invention consists of, in order from a magnification side: a first optical system that forms an intermediate image on a position conjugate to a magnification side imaging surface; and a second optical system that re-forms the intermediate image on a reduction side imaging surface. The first optical system includes at least two focusing lens groups that move with different loci during focusing. In a case where paraxial ray tracing is performed in a state where a focal length of a whole system is normalized to 1 and rays parallel to an optical axis at a height h of 1 are made incident from a reduction side, assuming that an inclination angle of the rays incident into the focusing lens group closest to the magnification side with respect to the optical axis is u1, an inclination angle of the rays emitted from the focusing lens group closest to the magnification side with respect to the optical axis is u2, and units of a value of u1 and a value of u2 are radian, Conditional Expression (1) is satisfied.

$$-0.3 < u1 - u2 < 0.3 \tag{1}$$

Further, it is more preferable to satisfy Conditional Expression (1-1).

$$-0.2 < u1 - u2 < 0.2 \tag{1-1}$$

In the imaging optical system of the present invention, assuming that the focal length of the whole system is f, an amount of change in back focal length in a case where only the focusing lens group closest to the magnification side moves by $|f|/100$ toward the reduction side is $\Delta Bf$, and an amount of change in imaging position of a principal ray on a tangential image plane at a maximum angle of view in a direction of the optical axis in a case where only the focusing lens group closest to the magnification side moves by $|f|/100$ toward the reduction side is $\Delta tas$, it is preferable to satisfy Conditional Expression (2). In addition, it is more preferable to satisfy Conditional Expression (2-1), and it is further more preferable to satisfy Conditional Expression (2-2).

$$-0.5 < \Delta Bf / \Delta tas < 0.5 \tag{2}$$

$$-0.25 < \Delta Bf / \Delta tas < 0.25 \tag{2-1}$$

$$0 < \Delta Bf / \Delta tas < 0.2 \tag{2-2}$$

Further, in a case where paraxial ray tracing is performed in a state where the focal length of the whole system is normalized to 1 and the rays parallel to the optical axis at the height h of 1 are made incident from the reduction side, assuming that a maximum value of heights of the rays in the focusing lens group is $|hfmax|$ and a maximum value of heights of the rays in the whole system is $|hmax|$, it is preferable to satisfy Conditional Expression (3).

Further, it is more preferable to satisfy Conditional Expression (3-1).

$$0.05 < |hfmax|/|hmax| < 0.5 \tag{3}$$

$$0.1 < |hfmax|/|hmax| < 0.4 \tag{3-1}$$

Further, it is preferable that the first optical system includes only two focusing lens groups.

Further, it is preferable that a ratio of an amount of movement of each of all the focusing lens groups included in the first optical system is constant.

Further, it is preferable that the imaging optical system further comprises two optical axis deflection units that deflect the optical axis by 90° on a reflective surface.

Further, it is preferable that the second optical system includes a zoom lens group that moves during zooming.

In this case, it is preferable that the second optical system includes at least three zoom lens groups that move with different loci during zooming and a lens group that has a positive refractive power and that remains stationary on the reduction side during zooming.

A projection display device of the present invention comprises: a light valve from which an optical image is output based on image data; and the above-mentioned imaging optical system of the present invention. The imaging optical system projects the optical image, which is output from the light valve, onto a screen.

An imaging apparatus of the present invention comprises the above-mentioned imaging optical system of the present invention.

It should be noted that the term "consists of ~" means that the system may include not only the above-mentioned elements but also lenses substantially having no powers, optical elements, which are not lenses, such as a stop, a mask, a cover glass, a filter, a mirror, and a prism, and mechanism parts such as a lens flange, a lens barrel, an imaging element, and a camera shaking correction mechanism.

Further, each of the terms "lens group". "focusing lens group", "zoom lens group" means that it may include not only a lens, but also optical elements such as a stop, a mask, a cover glass, a filter, a mirror, and a prism other than a lens. Regarding the above terms "lens group", "focusing lens group", and "zoom lens group", a group, of which a distance from an adjacent group in the direction of the optical axis changes during focusing or zooming, is set as a single lens group.

Further, among the symbols of the respective conditional expressions, the value of f, the value of ΔBf, and the value of Δtas are set as values in a case where the distance from the magnification side imaging surface to the first optical system is infinite. Also, in a case where the imaging optical system has the zooming function, values of ΔBf and Δtas are set as values at the wide-angle end.

According to the present invention, the imaging optical system consists of, in order from a magnification side: a first optical system that forms an intermediate image on a position conjugate to a magnification side imaging surface; and a second optical system that re-forms the intermediate image on a reduction side imaging surface. The first optical system includes at least two focusing lens groups that move with different loci during focusing. In a case where paraxial ray tracing is performed in a state where a focal length of a whole system is normalized to 1 and rays parallel to an optical axis at a height h of 1 are made incident from a reduction side, assuming that an inclination angle of the rays incident into the focusing lens group closest to the magnification side with respect to the optical axis is u1, an inclination angle of the rays emitted from the focusing lens group closest to the magnification side with respect to the optical axis is u2, and units of a value of u1 and a value of u2 are radian, Conditional Expression (1) is satisfied. Therefore, it is possible to provide an imaging optical system having a wide angle and a small change in performance in a case where a projection distance is changed, a projection display device having the imaging optical system, and an imaging apparatus having the imaging optical system.

$$-0.3 < u1 - u2 < 0.3 \quad (1)$$

DESCRIPTION OF THE PREFERRED EMBODIMENTS

Figure 1:
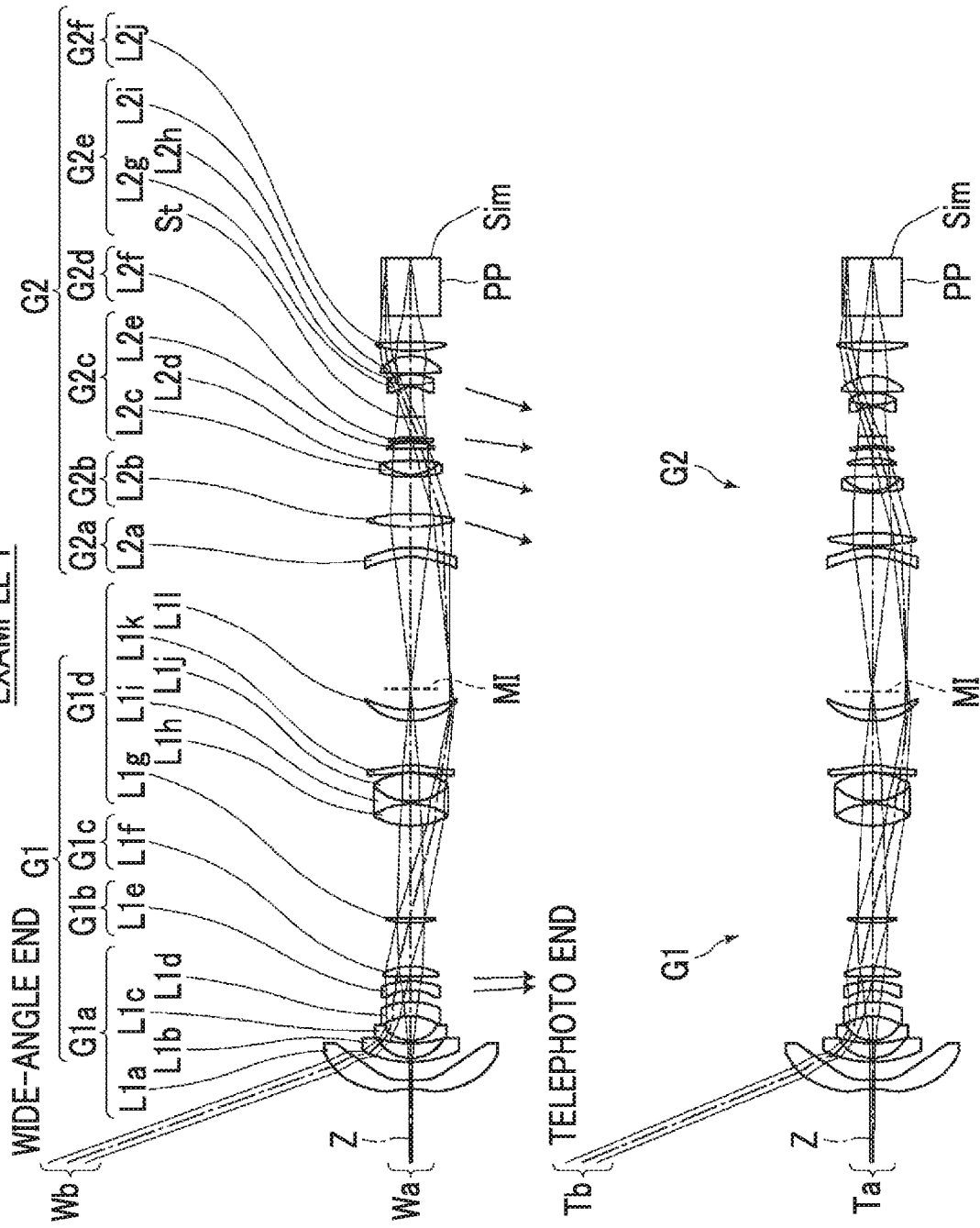
FIG. 1 is a cross-sectional view illustrating a lens configuration of an imaging optical system (common to Example 1) according to an embodiment of the present invention.

Hereinafter, an embodiment of the present invention will be described in detail with reference to the drawing. FIG. 1 is a cross-sectional view illustrating a lens configuration of an imaging optical system according to an embodiment of the present invention. The exemplary configuration shown in FIG. 1 is the same as the configuration of the imaging optical system of Example 1 to be described later. In FIG. 1, description is given under the assumption that the left side is the magnification side and the right side is the reduction side. Further, FIG. 1 shows a state where a distance from the magnification side imaging surface to the first imaging optical system is infinite. The upper part of the drawing shows a wide-angle end state, where on-axis rays Wa and rays with the maximum angle of view Wb as the rays are denoted. The lower part of the drawing shows a telephoto end state, where on-axis rays Ta and rays with the maximum angle of view Tb as the rays are denoted.

This imaging optical system is, for example, mounted on a projection display device, and can be used to project image information displayed on the light valve onto the screen. In FIG. 1, assuming that the imaging optical system is mounted on a projection display device, an optical member PP such as a filter or a prism used in a color synthesizing section or an illumination light separating section, and an image display surface Sim of a light valve are also shown. In the projection display device, rays, which are made to have image information through the image display surface Sim on the image display element, are incident into the imaging optical system through the optical member PP, and are projected onto a screen, which is not shown in the drawing, through the imaging optical system.

As shown in FIG. 1, the imaging optical system of the present embodiment is composed of, in order from the magnification side, a first optical system G1 that forms an intermediate image MI at a position conjugate to a magnification side imaging surface, and a second optical system G2 that re-forms the intermediate image MI on a reduction side imaging surface (image display surface Sim).

The first optical system G1 comprises at least two focusing lens groups that move with different loci during focusing.

In the imaging optical system of the present embodiment, as an example, the first optical system G1 is composed of, in order from the magnification side, a first-a lens group G1a composed of four lenses L1a to L1d, a first-b lens group G1b composed of only one lens L1e, a first-c lens group G1c composed of only one lens L1f, a first-d lens group G1d composed of 6 lenses L1g to L1l. Among these, the first-b lens group G1b and the first-c lens group G1c are configured as focusing lens groups.

In such a manner, by forming the intermediate image MI in the imaging optical system, it is possible to minimize the outer diameter of the lens while widening the angle of view.

In addition, by providing at least two focusing lens groups in the first optical system G1 closer to the magnification side than the intermediate image MI, it is possible to suppress fluctuation in distance of field curvature in a case of forming a wide-angle imaging optical system.

Further, in the imaging optical system of the present embodiment, paraxial ray tracing is performed in a state where a focal length of the whole system is normalized to 1 and rays parallel to an optical axis Z at a height h of 1 are made incident from a reduction side. In this case, assuming that an inclination angle of the rays incident into the focusing lens group closest to the magnification side with respect to the optical axis Z is u1, an inclination angle of the rays emitted from the focusing lens group closest to the magnification side with respect to the optical axis Z is u2, and units of a value of u1 and a value of u2 are radian, Conditional Expression (1) is satisfied.

$$-0.3 < u1-u2 < 0.3 \tag{1}$$

Fluctuation in distortion of the focusing lens group closest to the magnification side tends to occur in a case where the focusing lens group moves. However, by satisfying Conditional Expression (1), even in the wide-angle imaging optical system, it is possible to suppress change in distortion in a case where the projection distance changes. In addition, in a case where Conditional Expression (1-1) is satisfied, it is possible to obtain more favorable characteristics.

$$-0.2 < u1-u2 < 0.2 \tag{1-1}$$

In the imaging optical system of the present embodiment, assuming that the focal length of the whole system is f, an amount of change in back focal length in a case where only the focusing lens group closest to the magnification side moves by $|f|/100$ toward the reduction side is $\Delta Bf$, and an amount of change in imaging position of a principal ray on a tangential image plane at a maximum angle of view in a direction of the optical axis in a case where only the focusing lens group closest to the magnification side moves by $|f|/100$ toward the reduction side is $\Delta tas$, it is preferable to satisfy Conditional Expression (2). In a case where the wide-angle imaging optical system performs focusing, control of the image plane tilt around the imaging region becomes a problem. However, by making the focusing lens group, which is closest to the magnification side and which has a great effect on the image plane tilt around the imaging region, satisfy Conditional Expression (2), there is an advantage in suppressing the image plane tilt around the imaging region in a case where the projection distance changes. In addition, it is preferable to satisfy Conditional Expression (2-1), and it is more preferable to satisfy Conditional Expression (2-2) is satisfied. In this case, it is possible to obtain more favorable characteristics.

$$-0.5 < \Delta Bf/\Delta tas < 0.5 \tag{2}$$

$$-0.25 < \Delta Bf/\Delta tas < 0.25 \tag{2-1}$$

$$0 < \Delta Bf/\Delta tas < 0.2 \tag{2-2}$$

Further, in a case where paraxial ray tracing is performed in a state where the focal length of the whole system is normalized to 1 and the rays parallel to the optical axis at the height h of 1 are made incident from the reduction side, assuming that a maximum value of heights of the rays in the focusing lens group is $|hfmax|$ and a maximum value of heights of the rays in the whole system is $|hmax|$, it is preferable to satisfy Conditional Expression (3). By not allowing the result of Conditional Expression (3) to be equal to or less than the lower limit, it is possible to suppress the change in field curvature in a case where the projection distance changes. By not allowing the result of Conditional Expression (3) to be equal to or greater than the upper limit, it is possible to suppress the change in distortion in a case where the projection distance changes. In addition, in a case where Conditional Expression (3-1) is satisfied, it is possible to obtain more favorable characteristics.

$$0.05 < |hfmax|/|hmax| < 0.5 \tag{3}$$

$$0.1 < |hfmax|/|hmax| < 0.4 \tag{3-1}$$

Further, it is preferable that the first optical system G1 comprises only two focusing lens groups. With such a configuration, it is possible to simplify the configuration while ensuring the focusing performance. Thus, the configuration contributes to cost reduction.

Further, it is preferable that a ratio of an amount of movement of each of all the focusing lens groups comprised in the first optical system G1 is constant. With such a configuration, the mechanism for moving the focusing lens group becomes simple. Thus, the configuration contributes to cost reduction.

Figure 2:
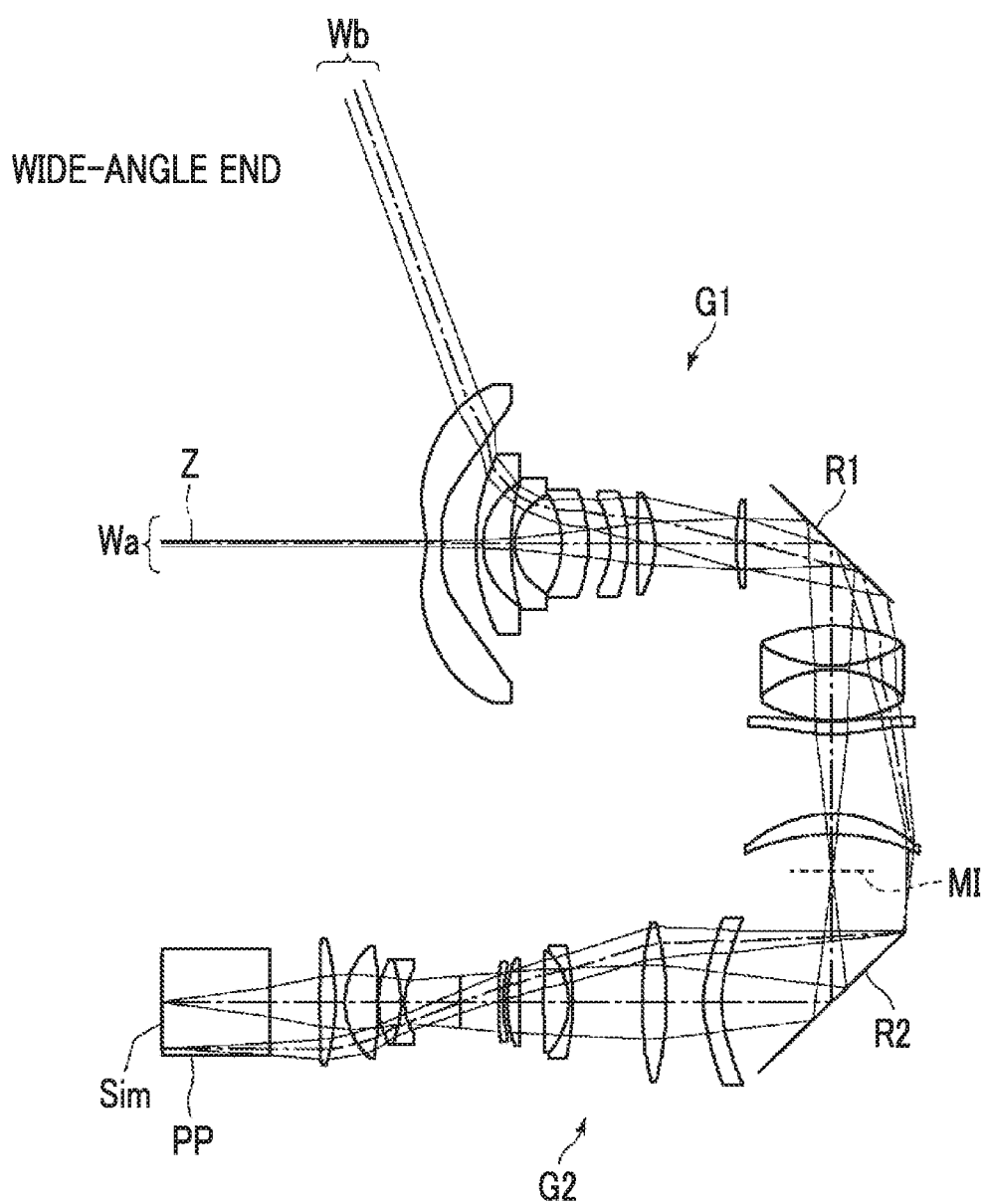
FIG. 2 is a cross-sectional view illustrating a configuration including a mirror of the imaging optical system according to Example 1 of the present invention.

Further, as an example shown in FIG. 2, it is preferable that the imaging optical system comprises two optical axis deflection units R1 and R2 that deflect the optical axis by 90° on a reflective surface. As the two optical axis deflection units R1 and R2, for example, an optical member capable of deflecting the optical axis, such as a mirror or a prism, can be used. With such a configuration, the length of the imaging optical system can be shortened, and there is an advantage in downsizing.

Further, it is preferable that the second optical system G2 comprises a zoom lens group that moves during zooming. In the imaging optical system of the present embodiment, the first optical system G1 closer to the magnification side than the intermediate image MI is a projection lens section, and the second optical system G2 closer to the reduction side than the intermediate image MI is a relay lens section. However, there is an advantage in suppressing fluctuation in field curvature and fluctuation in distortion by using the second optical system G2 as a zoom group instead of the first optical system G1 as a wide-angle system.

In this case, it is preferable that the second optical system G2 comprises at least three zoom lens groups that move with different loci during zooming and a lens group that has a positive refractive power and that remains stationary on the reduction side during zooming.

In such a manner, by providing at least three zoom lens groups in the second optical system G2, there is an advantage in suppressing various aberrations in the wide-angle imaging optical system. Further, by disposing a stationary lens group that has a positive refractive power at a position closest to the reduction side of the second optical system G2, there is an advantage in suppressing fluctuation in telecentricity during zooming.

Next, numerical examples of the imaging optical system of the present invention will be described. First, an imaging optical system of Example 1 will be described. FIG. 1 is a cross-sectional view illustrating a lens configuration of the imaging optical system of Example 1. FIG. 2 is a cross-sectional view illustrating a configuration including mirrors (optical axis deflection units R1 and R2) of the imaging optical system of Example 1. In FIGS. 1 and 2 and FIGS. 3 to 12 corresponding to Examples 2 to 6 to be described later, in a case where the optical axis is expanded, description is given under the assumption that the left side is the magnification side and the right side is the reduction side.

Further, FIGS. 1 to 6 corresponding to Examples 1 to 3 each show a state where a distance from the magnification side imaging surface to the first optical system G1 is infinite. The upper side of the drawing shows a wide-angle end state, where on-axis rays Wa and rays with the maximum angle of view Wb as the rays are denoted. The lower side of the drawing shows a telephoto end state, where on-axis rays Ta and rays with the maximum angle of view Tb as the rays are denoted.

Further, FIGS. 7 to 12 corresponding to Examples 4 to 6 each show a state where a distance from the magnification side imaging surface to the first optical system G1 is infinite, where on-axis rays Ba and rays with the maximum angle of view Bb as the rays are denoted.

The imaging optical system of Example 1 is composed of, in order from the magnification side, a first optical system G1 that forms an intermediate image MI at a position conjugate to a magnification side imaging surface, and a second optical system G2 that re-forms the intermediate image MI on a reduction side imaging surface (image display surface Sim).

The first optical system G1 is composed of, in order from the magnification side, a first-a lens group G1a composed of four lenses L1a to L1d, a first-b lens group G1b composed of only one lens L1e, a first-c lens group G1c composed of only one lens L1f, a first-d lens group G1d composed of 6 lenses L1g to L1l. Among these, the first-b lens group G1b and the first-c lens group G1c are configured as focusing lens groups.

The second optical system G2 is composed of, in order from the magnification side, a second-a lens group G2a composed of only one lens L2a, a second-b lens group G2b composed of only one lens L2b, a second-c lens group G2c composed of three lenses L2c to L2e, a second-d lens group G2d composed of only one lens L2f, a second-e lens group G2e composed of an aperture stop St and three lenses L2g to L2i, and a second-f lens group G2f composed of only one lens L2j. Among these, the second-b lens group G2b, the second-c lens group G2c, the second-d lens group G2d, and the second-e lens group G2e are configured as zoom lens groups.

Table 1 shows basic lens data of the imaging optical system of Example 1, Table 2 shows data about specification, Table 3 shows data relating to surface distances which are variable during focusing, Table 4 shows data about surface distances which are variable during zooming, and Table 5 shows data about aspheric surface coefficients thereof. Hereinafter, meanings of the reference signs in the tables are, for example, as described in Example 1, and are basically the same as those in Examples 2 to 6.

In the lens data of Table 1, the column of the surface number shows surface numbers. The surface of the elements closest to the magnification side is the first surface, and the surface numbers sequentially increase toward the reduction side. The column of the radius of curvature shows radii of curvature of the respective surfaces. The column of the on-axis surface distance shows distances on the optical axis Z between the respective surfaces and the subsequent surfaces. Further, the column of n shows a refractive index of each optical element at the d line (a wavelength of 587.6 nm (nanometers)), and the column of vd shows an Abbe number of each optical element at the d line (a wavelength of 587.6 nm (nanometers)). Furthermore, the sign of the radius of curvature is positive in a case where a surface has a shape convex toward the magnification side, and is negative in a case where a surface has a shape convex toward the reduction side. In the basic lens data, the aperture stop St and the optical member PP are additionally noted. In a place of a surface number of a surface corresponding to the aperture stop St, the surface number and a term of (stop) are noted. Further, in the lens data of Table 1, in each place of the surface distance which is variable during focusing and zooming, DD[surface number] is noted. Numerical values each corresponding to the DD[surface number] are shown in Tables 3 and 4.

In the data about the specification of Table 2, values of the zoom magnification, the focal length |f|, the back focal length Bf, the F number FNo., and the total angle of view 2ω(°) are noted.

In the lens data of Table 1, the reference sign * is attached to surface numbers of aspheric surfaces, and radii of curvature of the aspheric surfaces are represented by numerical values of paraxial radii of curvature. The data about aspheric surface coefficients of Table 5 shows the surface numbers of the aspheric surfaces and aspheric surface coefficients of the aspheric surfaces. The "E±n" (n: an integer) in numerical values of the aspheric surface coefficients of Table 5 indicates "×10$^{\pm n}$". The aspheric surface coefficients are values of the coefficients KA and Am in aspheric surface expression represented as the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, and KA and Am are aspheric surface coefficients, and Σ at the aspheric surface depth Zd means the sum with respect to m.

In the basic lens data and data about specification, "°" is used as a unit of angle, and a numerical value normalized with the focal length |f|=1 at the wide-angle end is described for length (distance).

TABLE 1

Example 1 Lens Data (n, ν are based on the d line)

| Surface Number | Radius of Curvature | Surface Distance | n | ν |
|---|---|---|---|---|
| *1 | −3.1171 | 0.9876 | 1.53158 | 55.08 |
| *2 | −6.1286 | 1.9754 | | |
| 3 | 12.7987 | 0.4161 | 1.89190 | 37.13 |
| 4 | 4.4414 | 1.6697 | | |
| 5 | 13.9952 | 0.2469 | 1.83481 | 42.74 |
| 6 | 3.4812 | 2.7239 | | |
| 7 | −5.8928 | 1.5986 | 1.58913 | 61.13 |
| 8 | −8.6795 | DD[8] | | |
| 9 | −5.6633 | 1.0383 | 1.48749 | 70.44 |
| 10 | −9.4812 | DD[10] | | |
| 11 | 161.7491 | 1.0511 | 1.48749 | 70.44 |
| 12 | −7.0206 | DD[12] | | |
| 13 | 14.9687 | 0.4847 | 1.84666 | 23.78 |
| 14 | ∞ | 10.2995 | | |
| 15 | 9.0649 | 2.4529 | 1.58913 | 61.13 |
| 16 | −7.6579 | 0.2716 | 1.84666 | 23.78 |
| 17 | 6.3649 | 3.1406 | 1.49700 | 81.61 |
| 18 | −8.2350 | 0.0496 | | |
| *19 | −13.7744 | 0.8098 | 1.51007 | 56.24 |
| *20 | −7.8718 | 4.9303 | | |
| 21 | 7.3739 | 1.2639 | 1.51680 | 64.20 |
| 22 | 12.0165 | 16.9122 | | |
| *23 | −7.3414 | 1.0625 | 1.51007 | 56.24 |
| *24 | −7.9904 | DD[24] | | |
| 25 | 20.3292 | 1.4204 | 1.80400 | 46.53 |
| 26 | −24.7536 | DD[26] | | |
| 27 | 15.2331 | 0.2469 | 1.84666 | 23.78 |
| 28 | 4.7213 | 1.5212 | 1.60562 | 43.71 |
| 29 | −52.7398 | 1.3579 | | |
| 30 | −85.7027 | 0.7103 | 1.54814 | 45.78 |
| 31 | −8.5663 | DD[31] | | |
| 32 | −10.8725 | 0.2639 | 1.80518 | 25.46 |
| 33 | −32.0118 | DD[33] | | |
| 34(Stop) | ∞ | 3.2819 | | |
| 35 | −3.7018 | 0.2346 | 1.77250 | 49.60 |

TABLE 1-continued

Example 1 Lens Data (n, ν are based on the d line)

| Surface Number | Radius of Curvature | Surface Distance | n | ν |
|---|---|---|---|---|
| 36 | 8.1759 | 1.3247 | 1.49700 | 81.61 |
| 37 | −5.7593 | 0.0639 | | |
| 38 | 45.1501 | 1.9373 | 1.49700 | 81.61 |
| 39 | −4.7756 | DD[39] | | |
| 40 | 14.8111 | 0.9341 | 1.84666 | 23.78 |
| 41 | −57.3949 | 2.9628 | | |
| 42 | ∞ | 6.4318 | 1.51633 | 64.14 |
| 43 | ∞ | 0.0528 | | |

TABLE 2

Example 1 Specification (d line)

| | Wide-Angle End | Telephoto End |
|---|---|---|
| Zoom Ratio | 1.00 | 1.15 |
| |f| | 1.00 | 1.15 |
| Bf | 7.25 | 7.25 |
| FNo. | 2.40 | 2.57 |
| 2ω[°] | 141.2 | 136.0 |

TABLE 3

Example 1 Variable Surface Distance (Focusing)

| Distance | 118.1 | 86.4 | 222.2 | Infinity |
|---|---|---|---|---|
| DD[8] | 1.2964 | 1.1396 | 1.4716 | 1.6438 |
| DD[10] | 0.5702 | 0.6748 | 0.4534 | 0.3386 |
| DD[12] | 4.8829 | 4.9352 | 4.8245 | 4.7671 |

TABLE 4

Example 1 Variable Surface Distance (Zooming)

| | Wide-Angle End | Telephoto End |
|---|---|---|
| DD[24] | 2.2522 | 0.1237 |
| DD[26] | 4.1511 | 4.5214 |
| DD[31] | 0.2471 | 1.0607 |
| DD[33] | 2.3589 | 1.1004 |
| DD[39] | 0.5768 | 2.7799 |

TABLE 5

Example 1 Aspheric Surface Coefficient

| Surface Number | 1 | 2 | 19 | 20 |
|---|---|---|---|---|
| KA | −6.21827693E−01 | −1.53558072E+00 | −1.58584455E+00 | 1.50000028E+00 |
| A3 | 6.29847256E−02 | 6.81089619E−02 | −1.00924906E−03 | −4.90304366E−04 |
| A4 | −6.07114974E−03 | −1.59175543E−02 | 5.02878734E−03 | 2.82793280E−03 |
| A5 | −2.49430836E−03 | 4.69001120E−03 | −1.03334134E−02 | −1.88173717E−03 |
| A6 | 6.75936632E−04 | −1.43120055E−03 | 1.23427090E−02 | 2.42428281E−03 |
| A7 | −5.30713379E−06 | 2.53800514E−04 | −6.76541270E−03 | −3.21778540E−04 |
| A8 | −1.84127708E−05 | −2.21588237E−05 | 1.64363671E−03 | −5.65817329E−04 |
| A9 | 1.78330254E−06 | −5.99638945E−07 | −4.27522367E−06 | 2.72616294E−04 |
| A10 | 2.21353736E−07 | 5.05694987E−07 | −7.54942636E−05 | −3.64888907E−05 |
| A11 | −4.21210231E−08 | −6.52777517E−08 | 4.38375676E−06 | −4.75400762E−07 |
| A12 | −6.68398829E−10 | 1.18215568E−09 | 3.90159123E−06 | −7.48569418E−07 |
| A13 | 4.73570231E−10 | 4.95578965E−10 | −5.92279086E−07 | 1.97335531E−07 |
| A14 | −1.14202018E−11 | −3.31787875E−11 | −1.81514715E−08 | 7.45023992E−08 |
| A15 | −2.89669084E−12 | −3.76328164E−12 | −2.49665079E−08 | −2.11093253E−08 |
| A16 | 1.33417176E−13 | 8.25297411E−13 | 9.52673083E−09 | 2.08580854E−09 |
| A17 | 9.31581825E−15 | −7.31949056E−14 | 1.47488357E−09 | −6.57873841E−10 |

TABLE 5-continued

Example 1 Aspheric Surface Coefficient

| A18 | −5.65279412E−16 | 3.81336339E−15 | −1.04665821E−09 | 1.46043799E−10 |
| A19 | −1.24144230E−17 | −1.15203168E−16 | 1.65810693E−10 | −8.52465455E−12 |
| A20 | 8.87463390E−19 | 1.60515457E−18 | −8.91943139E−12 | −1.94093775E−13 |

| Surface Number | 23 | 24 |
|---|---|---|
| KA | 1.12315934E+00 | 1.01078697E+00 |
| A3 | −2.58060006E−19 | −5.06955902E−19 |
| A4 | 1.84642864E−03 | 1.38113262E−03 |
| A5 | 8.80805838E−05 | 2.66745118E−05 |
| A6 | −5.95714796E−05 | −2.73357450E−06 |
| A7 | −8.57628099E−06 | −8.90969848E−06 |
| A8 | 1.99511407E−06 | −3.09156386E−06 |
| A9 | 6.55881835E−07 | 1.53952000E−06 |
| A10 | 3.46728100E−08 | 1.38663908E−07 |
| A11 | −3.19069474E−08 | −7.75543484E−08 |
| A12 | −4.54677608E−09 | −2.13823012E−09 |
| A13 | 7.07111118E−10 | 1.57572348E−09 |
| A14 | 1.08958494E−10 | 6.20706586E−12 |
| A15 | −5.65377220E−12 | −1.13894991E−11 |
| A16 | −8.01500699E−13 | 9.04628764E−14 |

Figure 13:
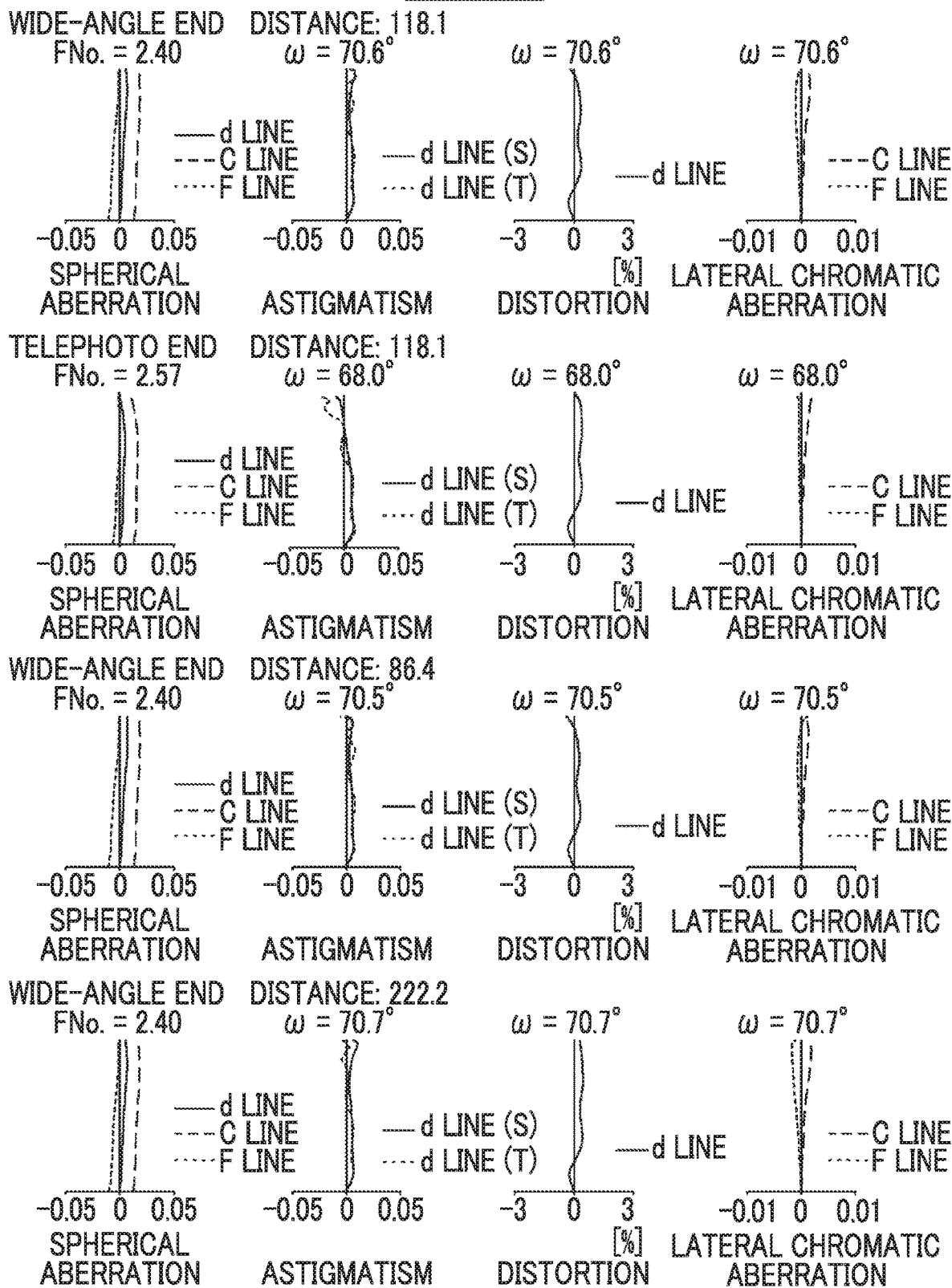
FIG. 13 is a diagram of aberrations of the imaging optical system of Example 1 of the present invention.

FIG. 13 shows a diagram of aberrations of the imaging optical system of Example 1. In addition, the first stage (the wide-angle end: the distance from the magnification side imaging surface to the first optical system G1 (hereinafter referred to as a projection distance) 118.1), the second stage (the telephoto end: the projection distance 118.1), the third stage (the wide-angle end: the projection distance 86.4), and the fourth stage (the wide-angle end: the projection distance 222.2) of FIG. 13 each show spherical aberration, astigmatism, distortion, and lateral chromatic aberration, in order from the left side. The aberration diagrams illustrating spherical aberration, astigmatism, and distortion indicate aberrations that occur in a case where the d line (a wavelength of 587.6 nm (nanometers)) is set as a reference wavelength. In the spherical aberration diagram, aberrations at the d line (a wavelength of 587.6 nm (nanometers)), the C line (a wavelength of 656.3 nm (nanometers)), and the F line (a wavelength of 486.1 nm (nanometers)) are respectively indicated by the solid line, the long dashed line, and the short dashed line. In the astigmatism diagram, aberrations in sagittal and tangential directions are respectively indicated by the solid line and the short dashed line. In the lateral chromatic aberration, aberrations at the C line (a wavelength of 656.3 nm (nanometers)) and F line (a wavelength of 486.1 nm (nanometers)) are respectively indicated by the long dashed line and the short dashed line. In addition, in the spherical aberration diagram, FNo. means an F number. In the other aberration diagrams, ω means a half angle of view.

Figure 3:
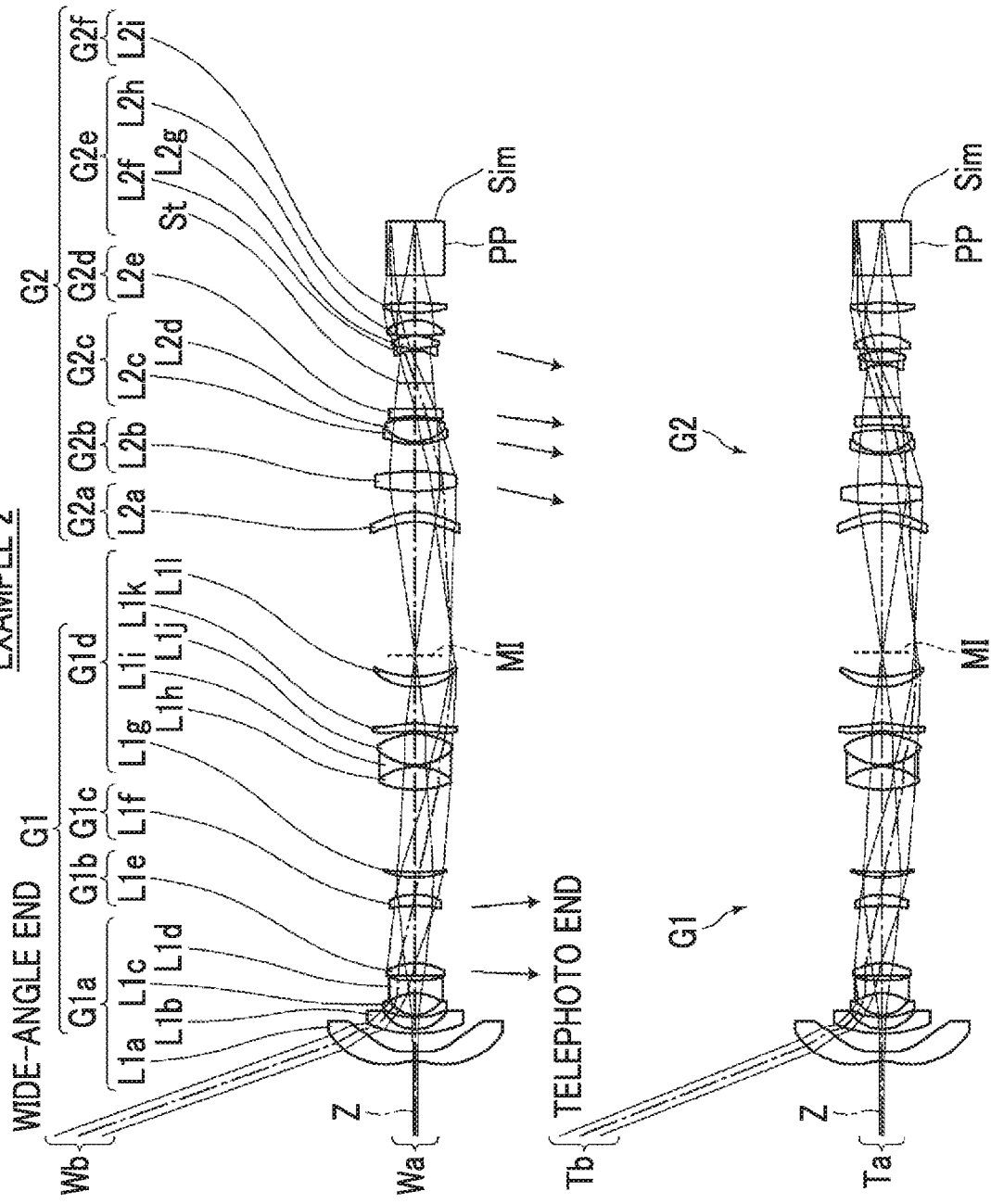
FIG. 3 is a cross-sectional view illustrating a lens configuration of an imaging optical system of Example 2 of the present invention.
Figure 4:
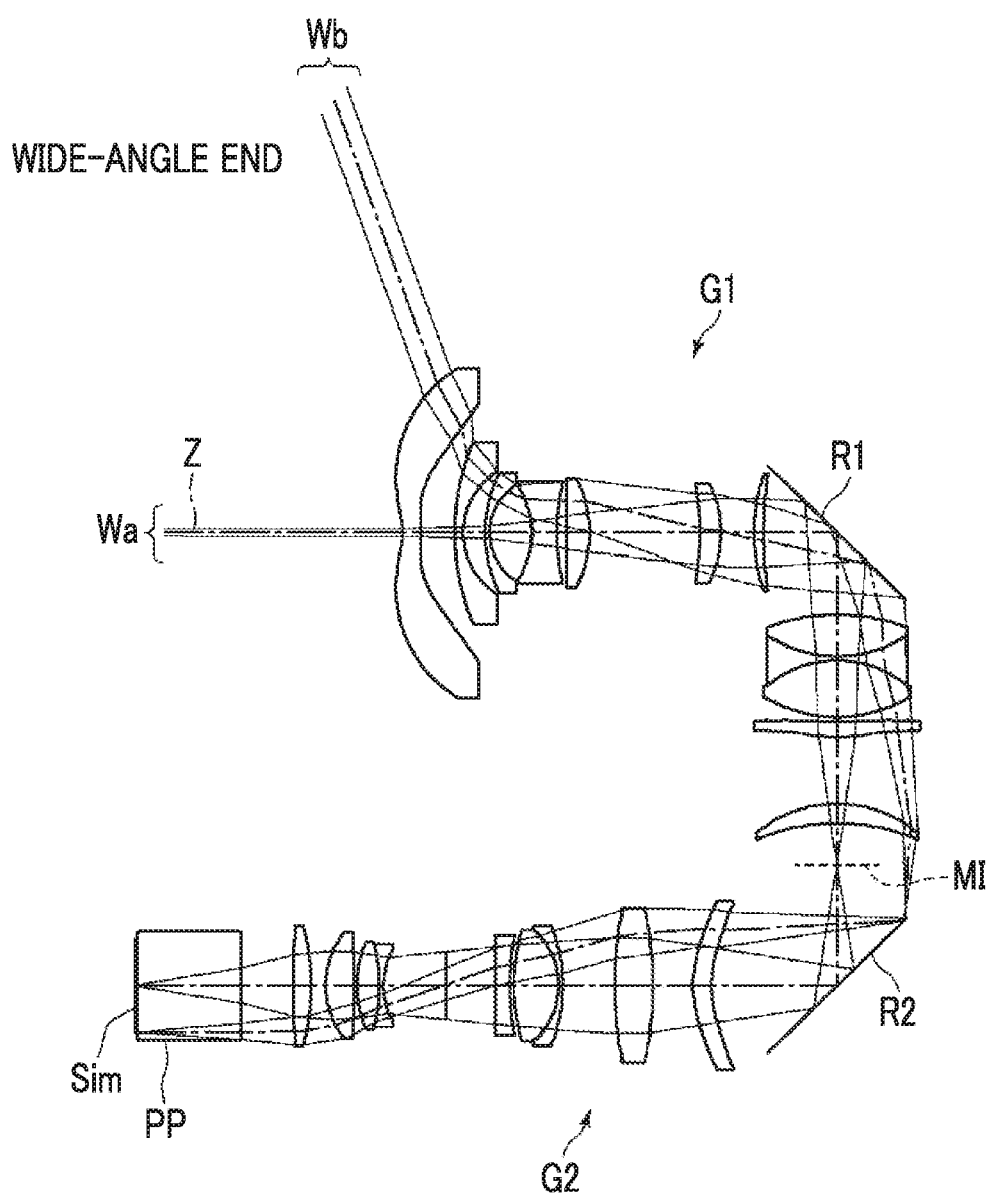
FIG. 4 is a cross-sectional view illustrating a configuration including a mirror of the imaging optical system according to Example 2 of the present invention.

Next, an imaging optical system of Example 2 will be described. FIG. 3 is a cross-sectional view illustrating a lens configuration of the imaging optical system of Example 2, and FIG. 4 is a cross-sectional view illustrating a configuration including mirrors (optical axis deflection units R1 and R2) of the imaging optical system of Example 2. The group configuration of the imaging optical system of Example 2 is the same as that of the imaging optical system of Example 1 except for the following configuration. The second optical system G2 is composed of, in order from the magnification side, a second-a lens group G2a composed of only one lens L2a, a second-b lens group G2b composed of only one lens L2b, a second-c lens group G2c composed of two lenses L2c and L2d, a second-d lens group G2d composed of only one lens L2e, a second-e lens group G2e composed of an aperture stop St and three lenses L2f to L2h, and a second-f lens group G2f composed of only one lens L2i.

Figure 14:
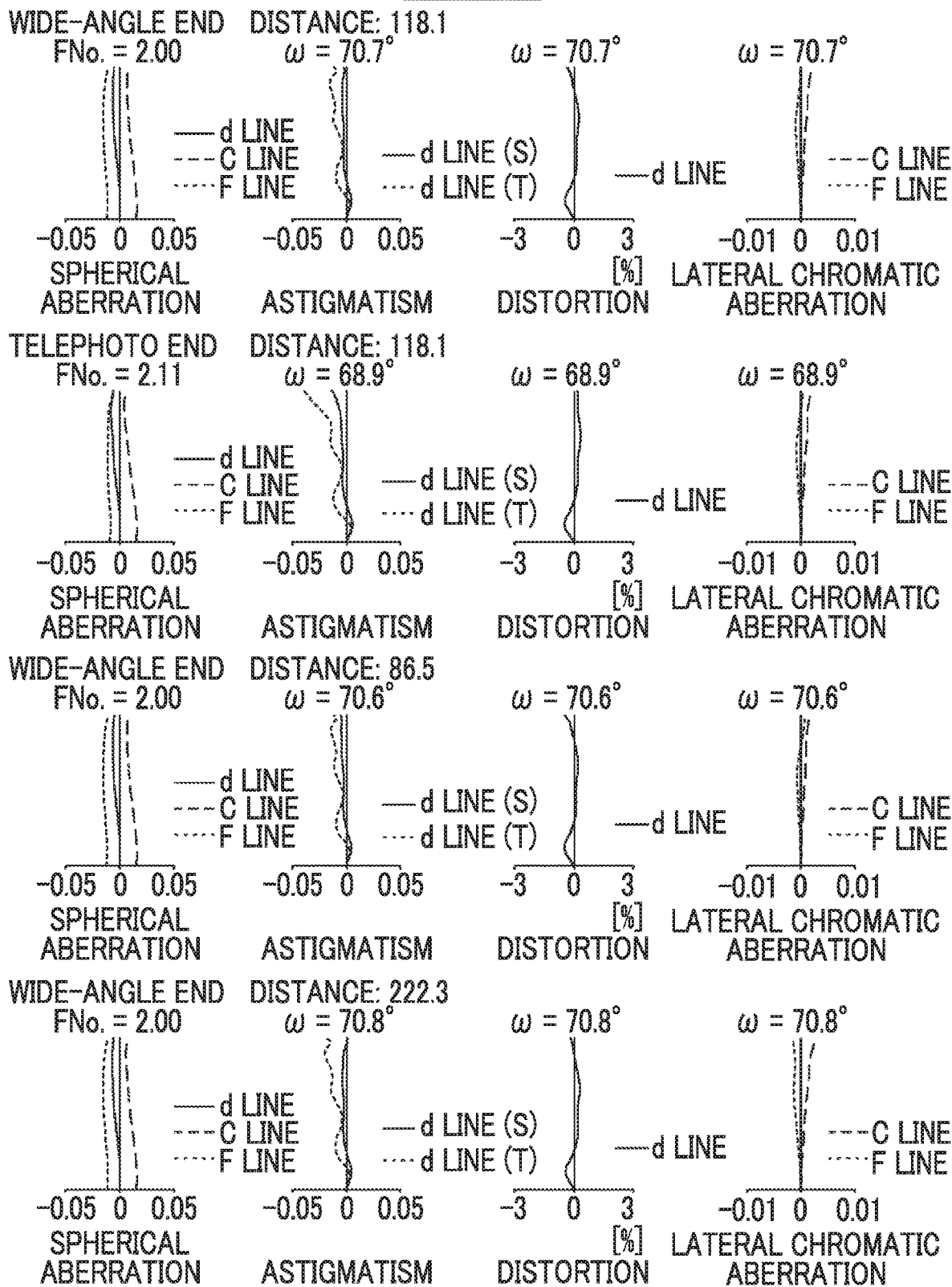
FIG. 14 is a diagram of aberrations of the imaging optical system of Example 2 of the present invention.

Further. Table 6 shows basic lens data of the imaging optical system of Example 2, Table 7 shows data about specification, Table 8 shows data relating to surface distances which are variable during focusing, Table 9 shows data about surface distances which are variable during zooming, Table 10 shows data about aspheric surface coefficients thereof, and FIG. 14 shows aberration diagrams. In addition, the projection conditions in FIG. 14 are as shown in the first stage (the wide-angle end: the projection distance 118.1), the second stage (the telephoto end: the projection distance 118.1), the third stage (the wide-angle end: the projection distance 86.5), and the fourth stage (the wide-angle end: the projection distance 222.3).

TABLE 6

Example 2 Lens Data (n, ν are based on the d line)

| Surface | Radius of Curvature | Surface Distance | n | ν |
|---|---|---|---|---|
| *1 | −2.9527 | 1.1116 | 1.53158 | 55.08 |
| *2 | −5.8094 | 1.9931 | | |
| 3 | 14.6679 | 0.4940 | 1.89190 | 37.13 |
| 4 | 4.4823 | 1.3174 | | |
| 5 | 8.2634 | 0.2717 | 1.83481 | 42.72 |
| 6 | 3.5207 | 2.4712 | | |
| 7 | −5.6927 | 1.4761 | 1.65844 | 50.88 |
| 8 | 14.6007 | DD[8] | | |
| 9 | 713.9718 | 1.3649 | 1.80400 | 46.58 |
| 10 | −7.3678 | DD[10] | | |
| 11 | −14.9774 | 1.2439 | 1.48749 | 70.24 |
| 12 | −6.7905 | DD[12] | | |
| 13 | 10.8912 | 0.5643 | 1.80518 | 25.46 |
| 14 | 23.9103 | 9.3866 | | |
| 15 | 11.3413 | 2.5823 | 1.58913 | 61.13 |
| 16 | −7.2684 | 0.2468 | 1.84666 | 23.78 |
| 17 | 6.3768 | 3.4806 | 1.49700 | 81.61 |
| 18 | −8.2345 | 0.2953 | | |
| *19 | −17.3522 | 0.9510 | 1.51007 | 56.24 |
| *20 | −8.0176 | 4.0976 | | |
| 21 | 7.2581 | 1.2068 | 1.48749 | 70.24 |
| 22 | 11.9252 | 17.4724 | | |
| *23 | −6.8218 | 1.1187 | 1.51007 | 56.24 |
| *24 | −6.9482 | DD[24] | | |

TABLE 6-continued

Example 2 Lens Data (n, ν are based on the d line)

| Surface | Radius of Curvature | Surface Distance | n | ν |
|---|---|---|---|---|
| 25 | 24.0334 | 2.2473 | 1.80400 | 46.58 |
| 26 | −25.1861 | DD[26] | | |
| 27 | 10.3251 | 0.2468 | 1.84666 | 23.78 |
| 28 | 4.7371 | 2.5917 | 1.56732 | 42.82 |
| 29 | −12.7042 | DD[29] | | |
| 30 | −17.3426 | 0.8478 | 1.84666 | 23.78 |
| 31 | −1448.4238 | DD[31] | | |
| 32(Stop) | ∞ | 3.7339 | | |
| 33 | −4.6604 | 0.2470 | 1.80400 | 46.58 |
| 34 | 10.0437 | 1.3452 | 1.49700 | 81.61 |
| 35 | −6.8875 | 0.1578 | | |
| 36 | 46.2191 | 1.6984 | 1.49700 | 81.61 |
| 37 | −5.4051 | DD[37] | | |
| 38 | 15.4436 | 1.0587 | 1.84666 | 23.78 |
| 39 | −48.8026 | 3.1125 | | |
| 40 | ∞ | 6.1756 | 1.51680 | 64.20 |
| 41 | ∞ | 0.1376 | | |

TABLE 7

Example 2 Specification (d line)

| | Wide-Angle End | Telephoto End |
|---|---|---|
| Zoom Ratio | 1.00 | 1.10 |
| \|f\| | 1.00 | 1.10 |
| Bf | 0.13 | 0.13 |

TABLE 7-continued

Example 2 Specification (d line)

| | Wide-Angle End | Telephoto End |
|---|---|---|
| FNo. | 2.00 | 2.11 |
| 2ω[°] | 141.4 | 137.8 |

TABLE 8

Example 2 Variable Surface Distance (Focusing)

| Distance | 118.1 | 86.5 | 222.3 | Infinity |
|---|---|---|---|---|
| DD[8] | 0.5658 | 0.5855 | 0.5410 | 0.5083 |
| DD[10] | 6.5764 | 6.4907 | 6.6815 | 6.8212 |
| DD[12] | 1.9590 | 2.0250 | 1.8788 | 1.7717 |

TABLE 9

Example 2 Variable Surface Distance (Zooming)

| | Wide-Angle End | Telephoto End |
|---|---|---|
| DD[24] | 2.3768 | 0.9137 |
| DD[26] | 3.1126 | 3.3231 |
| DD[29] | 0.2468 | 0.6277 |
| DD[31] | 2.9317 | 2.1693 |
| DD[37] | 0.8773 | 2.5114 |

TABLE 10

Example 2 Aspheric Surface Coefficient

| Surface Number | 1 | 2 | 19 | 20 |
|---|---|---|---|---|
| KA | −6.27001960E−01 | −2.13211584E+00 | −2.59704470E+00 | 9.96412236E−01 |
| A3 | 5.67804728E−02 | 6.21093044E−02 | 0.00000000E+00 | 0.00000000E+00 |
| A4 | −5.04642157E−03 | −1.76089035E−02 | 4.15755558E−03 | 3.65203161E−03 |
| A5 | −2.23881633E−03 | 6.16920637E−03 | −2.51963604E−03 | −8.17955595E−04 |
| A6 | 5.87591418E−04 | −1.82356441E−03 | −6.46207476E−04 | 7.27651692E−04 |
| A7 | −4.12249386E−06 | 3.18738133E−04 | 3.44586559E−03 | −8.69762905E−05 |
| A8 | −1.58491045E−05 | −2.61780227E−05 | −2.67747385E−03 | 5.07174556E−05 |
| A9 | 1.52970864E−06 | −1.39706368E−06 | 7.81388077E−04 | −1.53884028E−04 |
| A10 | 1.87406558E−07 | 6.65853936E−07 | 2.55013280E−05 | 5.15177621E−05 |
| A11 | −3.55835351E−08 | −7.65007833E−08 | −7.11029051E−05 | 2.12581973E−05 |
| A12 | −5.57100203E−10 | 1.89984498E−09 | 1.49674189E−05 | −1.42104694E−05 |
| A13 | 3.92085012E−10 | 5.26834997E−10 | −4.13219054E−07 | 9.40667835E−07 |
| A14 | −9.11556265E−12 | −5.03917443E−11 | −2.47659900E−07 | 8.80942340E−07 |
| A15 | −2.34622370E−12 | −4.49432404E−12 | 9.04754734E−08 | −1.74806182E−07 |
| A16 | 1.03472771E−13 | 1.36988053E−12 | −2.84254672E−08 | −1.42214884E−08 |
| A17 | 7.37825726E−15 | −1.34703395E−13 | 2.91295103E−09 | 6.32457358E−09 |
| A18 | −4.24147535E−16 | 7.06952824E−15 | 5.46345472E−10 | −2.24931113E−10 |
| A19 | −9.61468443E−18 | −2.06744561E−16 | −1.40321283E−10 | −6.82415658E−11 |
| A20 | 6.43334072E−19 | 2.84180934E−18 | 8.36137214E−12 | 5.45265400E−12 |

| Surface Number | 23 | 24 |
|---|---|---|
| KA | 9.99991009E−01 | 9.95694655E−01 |
| A3 | 0.00000000E+00 | 0.00000000E+00 |
| A4 | 2.11388542E−03 | 1.52197992E−03 |
| A5 | −1.31472336E−04 | −1.10102245E−14 |
| A6 | −8.03100538E−06 | 1.34203547E−05 |
| A7 | 2.13490163E−05 | 1.53516052E−05 |
| A8 | −7.07700246E−06 | −7.05676099E−06 |
| A9 | −7.78323998E−07 | −5.55108426E−08 |
| A10 | 5.99014366E−07 | 4.56263683E−07 |
| A11 | −5.27311963E−09 | −3.10521565E−08 |
| A12 | −2.19836295E−08 | −1.35683877E−08 |
| A13 | 6.72687263E−10 | 9.99286496E−10 |
| A14 | 3.82397045E−10 | 2.01470419E−10 |

TABLE 10-continued

Example 2 Aspheric Surface Coefficient

| | | |
|---|---|---|
| A15 | −8.42548670E−12 | −9.29157227E−12 |
| A16 | −2.52579693E−12 | −1.20266577E−12 |

Figure 5:
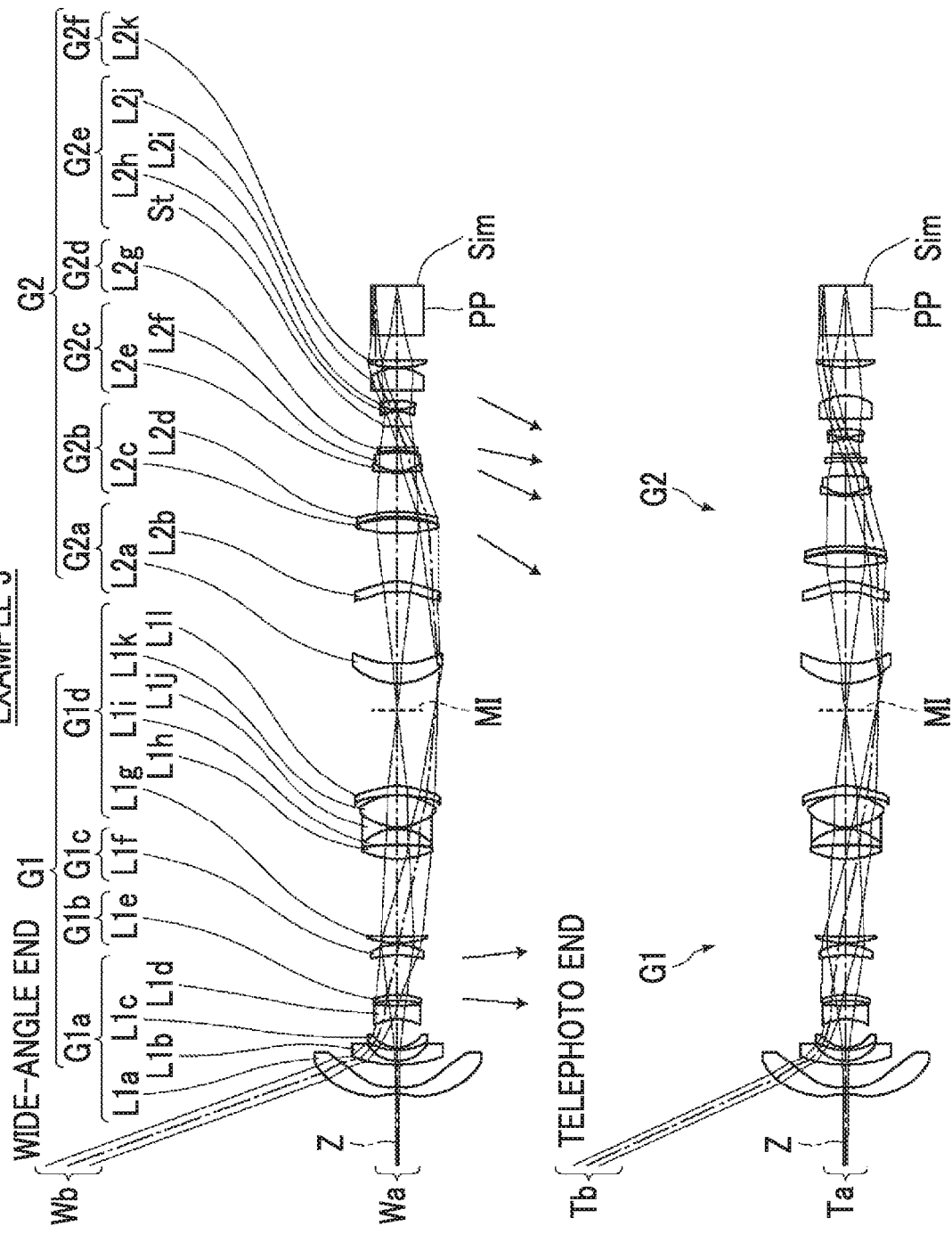
FIG. 5 is a cross-sectional view illustrating a lens configuration of an imaging optical system of Example 3 of the present invention.
Figure 6:
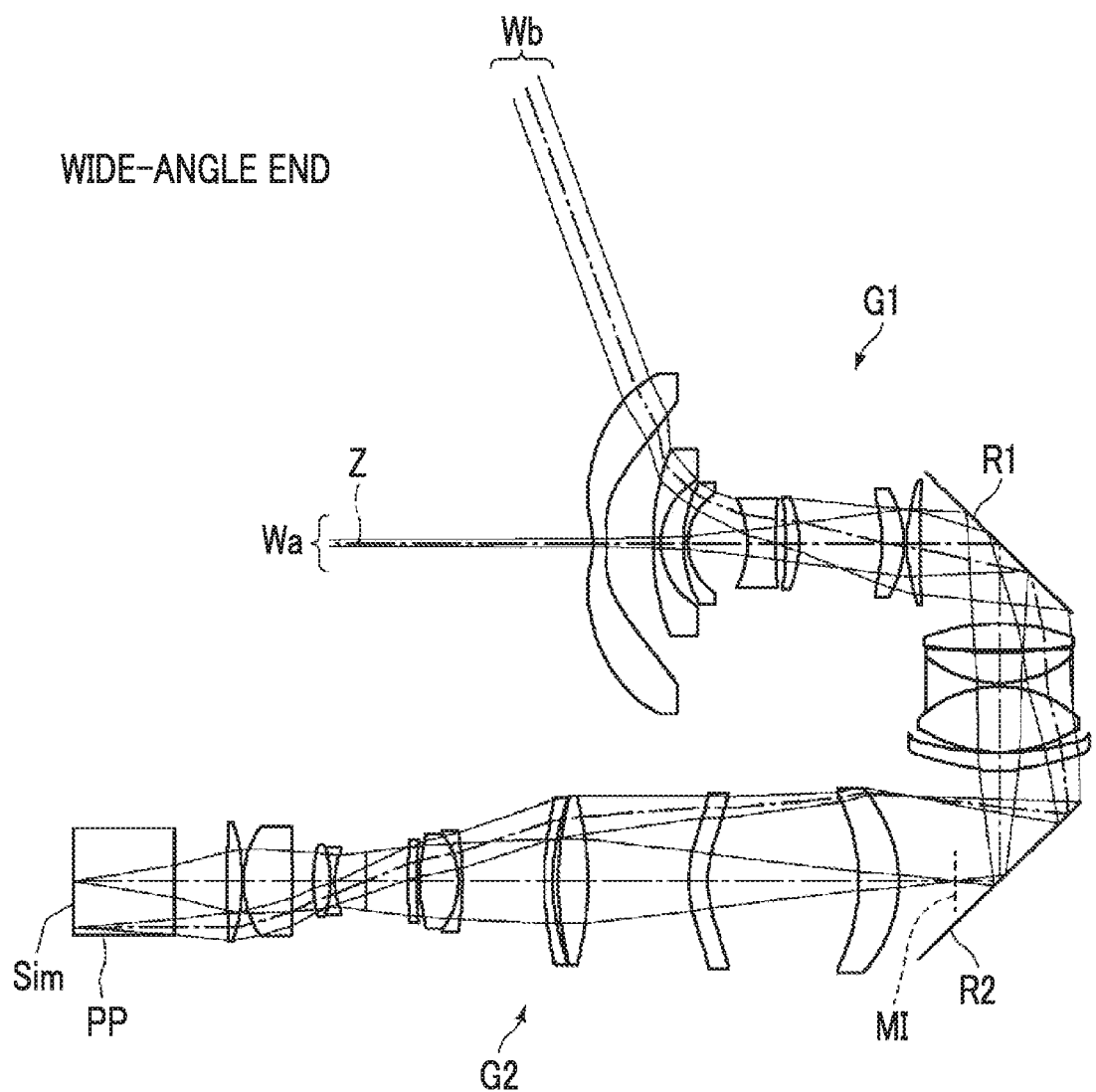
FIG. 6 is a cross-sectional view illustrating a configuration including mirrors of the imaging optical system according to Example 3 of the present invention.

Next, an imaging optical system of Example 3 will be described. FIG. 5 is a cross-sectional view illustrating a lens configuration of the imaging optical system of Example 3, and FIG. 6 is a cross-sectional view illustrating a configuration including mirrors (optical axis deflection units R1 and R2) of the imaging optical system of Example 3. The group configuration of the imaging optical system of Example 3 is the same as that of the imaging optical system of Example 1 except for the following configuration. The second optical system G2 is composed of, in order from the magnification side, a second-a lens group G2a composed of two lenses L2a and L2b, a second-b lens group G2b composed of two lenses L2c and L2d, a second-c lens group G2c composed of two lenses L2e and L2f, a second-d lens group G2d composed of only one lens L2g, a second-e lens group G2e composed of an aperture stop St and three lenses L2h to L2j, and a second-f lens group G2f composed of only one lens L2k.

Figure 15:
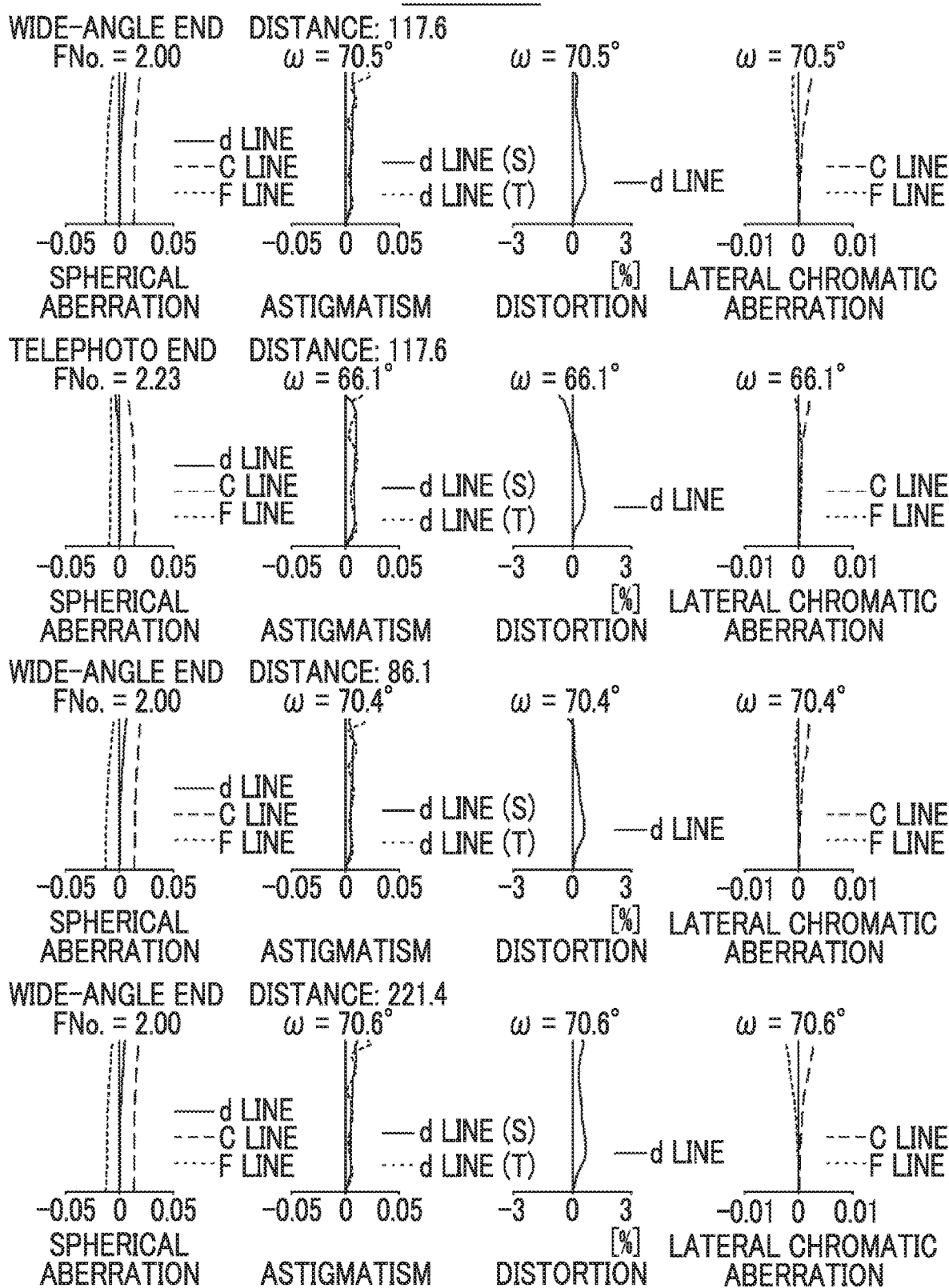
FIG. 15 is a diagram of aberrations of the imaging optical system of Example 3 of the present invention.

Further, Table 11 shows basic lens data of the imaging optical system of Example 3, Table 12 shows data about specification, Table 13 shows data relating to surface distances which are variable during focusing, Table 14 shows data about surface distances which are variable during zooming, Table 15 shows data about aspheric surface coefficients thereof, and FIG. 15 shows aberration diagrams. In addition, the projection conditions in FIG. 15 are as shown in the first stage (the wide-angle end: the projection distance 117.6), the second stage (the telephoto end: the projection distance 117.6), the third stage (the wide-angle end: the projection distance 86.1), and the fourth stage (the wide-angle end: the projection distance 221.4).

TABLE 11

Example 3 Lens Data (n, ν are based on the d line)

| Surface | Radius of Curvature | Surface Distance | n | ν |
|---|---|---|---|---|
| *1 | −3.1367 | 0.8176 | 1.53158 | 55.08 |
| *2 | −5.9086 | 2.7573 | | |
| 3 | 16.3630 | 0.4922 | 1.89190 | 37.13 |
| 4 | 4.6563 | 1.3480 | | |
| 5 | 7.9978 | 0.2707 | 1.83481 | 42.72 |
| 6 | 3.7275 | 3.5479 | | |
| 7 | −6.2711 | 1.6642 | 1.51680 | 64.20 |
| 8 | 26.1830 | DD[8] | | |
| 9 | −19.0424 | 0.7970 | 1.67790 | 55.34 |
| 10 | −7.9136 | DD[10] | | |
| 11 | −12.8138 | 1.3250 | 1.48749 | 70.24 |
| 12 | −6.8711 | DD[12] | | |
| 13 | 12.4068 | 0.7496 | 1.80518 | 25.46 |
| 14 | 54.8174 | 9.7341 | | |
| 15 | 11.9584 | 1.6761 | 1.49700 | 81.61 |
| 16 | −36.0066 | 0.0784 | | |
| 17 | −38.4479 | 1.9185 | 1.65160 | 58.55 |
| 18 | −6.5933 | 0.2462 | 1.80518 | 25.42 |
| 19 | 6.7713 | 4.0540 | 1.49700 | 81.61 |
| 20 | −8.3411 | 0.0494 | | |
| *21 | −13.4619 | 1.1069 | 1.51007 | 56.24 |
| *22 | −7.7236 | 12.7933 | | |
| 23 | 8.6465 | 2.3997 | 1.56106 | 62.61 |
| 24 | 12.1798 | 8.9559 | | |
| *25 | −7.1214 | 1.1625 | 1.51007 | 56.24 |
| *26 | −7.4606 | DD[26] | | |
| 27 | 21.0363 | 1.7738 | 1.77250 | 49.60 |
| 28 | −20.2628 | 0.3188 | | |
| 29 | −14.8292 | 0.5036 | 1.56384 | 60.67 |
| 30 | −21.4743 | DD[30] | | |
| 31 | 18.6315 | 0.2461 | 1.84666 | 23.78 |
| 32 | 5.0391 | 2.2903 | 1.70154 | 41.24 |
| 33 | −12.5704 | DD[33] | | |
| 34 | −16.8265 | 0.4575 | 1.84666 | 23.78 |
| 35 | −76.2847 | DD[35] | | |
| 36(Stop) | ∞ | 1.9063 | | |
| 37 | −4.6540 | 0.2461 | 1.78590 | 44.20 |
| 38 | 6.8847 | 1.0459 | 1.59282 | 68.62 |
| 39 | −7.7923 | 1.2221 | | |
| 40 | 86.9565 | 2.8849 | 1.49700 | 81.61 |
| 41 | −6.0397 | DD[41] | | |
| 42 | 12.1541 | 0.9257 | 1.80518 | 25.46 |
| 43 | −96.5327 | 3.0999 | | |
| 44 | ∞ | 6.1507 | 1.51633 | 64.14 |
| 45 | ∞ | −0.0321 | | |

TABLE 12

Example 3 Specification (d line)

| | Wide-Angle End | Telephoto End |
|---|---|---|
| Zoom Ratio | 1.00 | 1.27 |
| \|f\| | 1.00 | 1.27 |
| Bf | 7.12 | 7.11 |
| FNo. | 2.00 | 2.23 |
| 2ω[°] | 141.0 | 132.2 |

TABLE 13

Example 3 Variable Surface Distance (Focusing)

| Distance | 117.6 | 86.1 | 221.4 | Infinity |
|---|---|---|---|---|
| DD[8] | 0.6477 | 0.7031 | 0.5790 | 0.4934 |
| DD[10] | 4.8671 | 4.7378 | 5.0246 | 5.2197 |
| DD[12] | 0.2243 | 0.2982 | 0.1354 | 0.0260 |

TABLE 14

Example 3 Variable Surface Distance (Zooming)

| | Wide-Angle End | Telephoto End |
|---|---|---|
| DD[26] | 6.0372 | 1.8345 |
| DD[30] | 4.9052 | 6.2765 |
| DD[33] | 0.2512 | 1.7360 |
| DD[35] | 2.5115 | 0.4146 |
| DD[41] | 0.0493 | 3.4928 |

TABLE 15

Example 3 Aspheric Surface Coefficient

| Surface Number | 1 | 2 | 21 | 22 |
|---|---|---|---|---|
| KA | −6.52353110E−01 | −4.80178680E+00 | −3.63354739E−01 | 1.26695016E+00 |
| A3 | 6.28167718E−02 | 6.32597846E−02 | 4.97537223E−17 | 9.63501905E−18 |
| A4 | −7.22236886E−03 | −1.48497015E−02 | 2.96546426E−03 | 4.02339234E−03 |
| A5 | −1.97292845E−03 | 3.61022289E−03 | −2.60002821E−03 | −2.61194337E−03 |
| A6 | 5.87247823E−04 | −1.15332062E−03 | 5.47108424E−04 | 7.93482557E−04 |
| A7 | −1.31057032E−05 | 2.39253249E−04 | −2.32507060E−04 | −3.75602890E−04 |
| A8 | −1.34227105E−05 | −2.01492385E−05 | 9.25000766E−04 | 8.12845562E−04 |
| A9 | 1.41654302E−06 | −1.42630445E−06 | −6.61993509E−04 | −5.12226125E−04 |
| A10 | 1.30512476E−07 | 4.42053753E−07 | 9.81406153E−05 | 4.73910239E−05 |
| A11 | −2.77058167E−08 | −3.13312993E−08 | 6.27601842E−05 | 6.05262308E−05 |
| A12 | −1.58095144E−10 | 1.60211715E−11 | −2.42157450E−05 | −1.93989612E−05 |
| A13 | 2.66837336E−10 | 1.73947943E−10 | −4.26824378E−07 | −9.90048942E−07 |
| A14 | −7.62558507E−12 | −1.59121985E−11 | 1.47639244E−06 | 1.28083833E−06 |
| A15 | −1.41077777E−12 | −1.43983112E−12 | −1.63664457E−07 | −1.21342260E−07 |
| A16 | 6.75978883E−14 | 4.98913078E−13 | −3.29706384E−08 | −2.95856848E−08 |
| A17 | 3.93520730E−15 | −4.88867984E−14 | 7.17470692E−09 | 5.81773026E−09 |
| A18 | −2.39879466E−16 | 2.36505754E−15 | 3.20228857E−11 | 5.25576165E−11 |
| A19 | −4.55503389E−18 | −6.29691540E−17 | −9.22081587E−11 | −7.48740189E−11 |
| A20 | 3.21785134E−19 | 8.72574658E−19 | 5.60933258E−12 | 4.42237220E−12 |

| Surface Number | 25 | 26 |
|---|---|---|
| KA | 1.15305757E+00 | 1.08988549E+00 |
| A3 | −8.31098163E−19 | −5.67685505E−19 |
| A4 | 7.94055442E−04 | 6.80337492E−04 |
| A5 | 6.89001429E−04 | 3.79834459E−04 |
| A6 | −1.59629068E−04 | −5.79336138E−05 |
| A7 | −3.95942952E−05 | −2.43764241E−05 |
| A8 | 1.76449552E−05 | 5.32972321E−06 |
| A9 | 9.20757718E−07 | 1.60550776E−06 |
| A10 | −8.13653280E−07 | −3.00670671E−07 |
| A11 | −2.00349896E−09 | −6.24590134E−08 |
| A12 | 1.99608545E−08 | 1.09141126E−08 |
| A13 | −2.25346500E−10 | 1.17741477E−09 |
| A14 | −2.65583265E−10 | −2.10385072E−10 |
| A15 | 2.29876038E−12 | −8.45504935E−12 |
| A16 | 1.56675644E−12 | 1.60590486E−12 |

Figure 7:
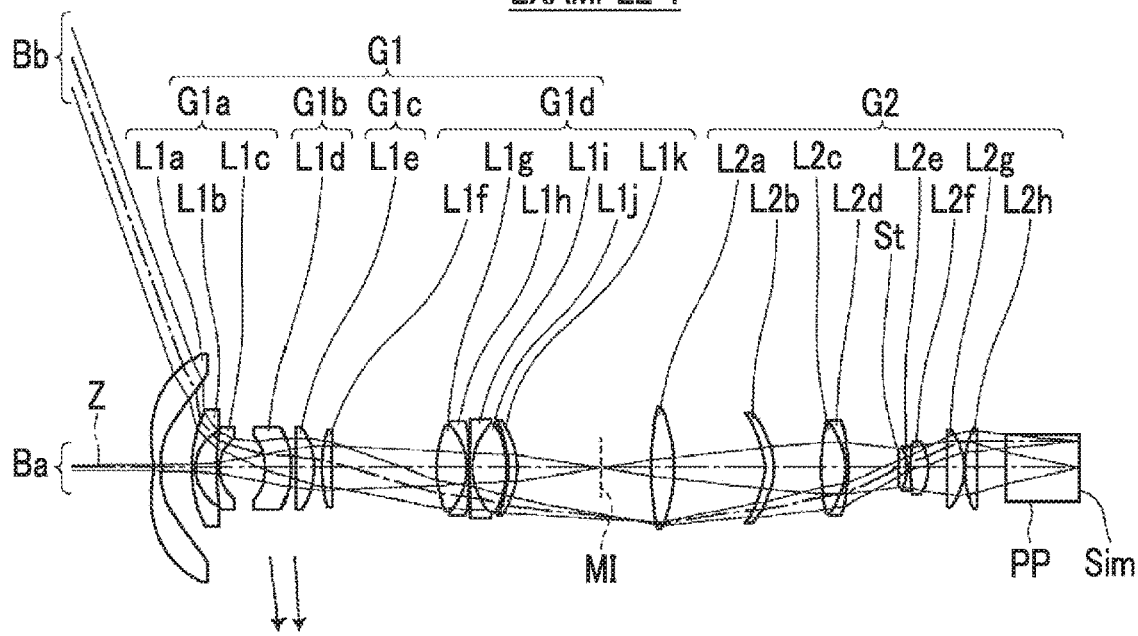
FIG. 7 is a cross-sectional view illustrating a lens configuration of an imaging optical system of Example 4 of the present invention.
Figure 8:
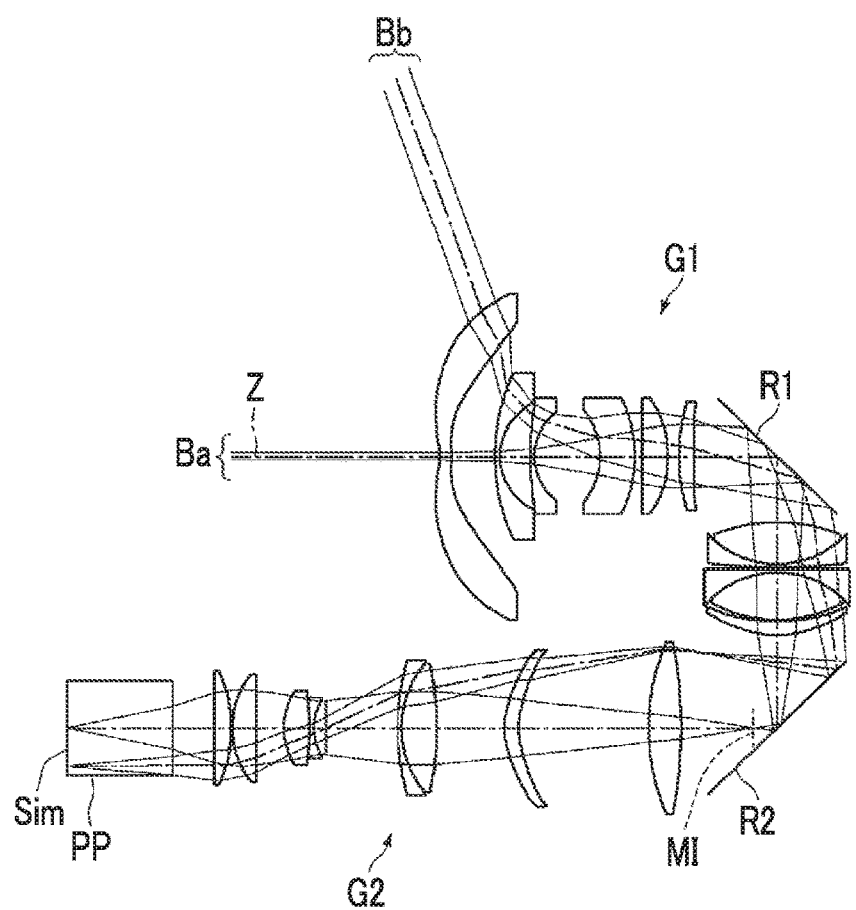
FIG. 8 is a cross-sectional view illustrating a configuration including mirrors of the imaging optical system according to Example 4 of the present invention.

Next, an imaging optical system of Example 4 will be described. FIG. 7 is a cross-sectional view illustrating a lens configuration of the imaging optical system of Example 4, and FIG. 8 is a cross-sectional view illustrating a configuration including mirrors (optical axis deflection units R1 and R2) of the imaging optical system of Example 4. The imaging optical system of Example 4 is composed of, in order from the magnification side, a first optical system G1 that forms an intermediate image MI at a position conjugate to a magnification side imaging surface, and a second optical system G2 that re-forms the intermediate image MI on a reduction side imaging surface (image display surface Sim). The first optical system G1 is composed of, in order from the magnification side, a first-a lens group G1a composed of three lenses L1a to L1c, a first-b lens group G1b composed of only one lens L1d, a first-c lens group G1c composed of only one lens L1e, and a first-d lens group G1d composed of six lenses L1f to L1k. Among these, the first-b lens group G1b and the first-c lens group G1c are configured as focusing lens groups. The second optical system G2 does not comprise the zoom lens group but is composed of an aperture stop St and eight lenses L2a to L2h.

Figure 16:
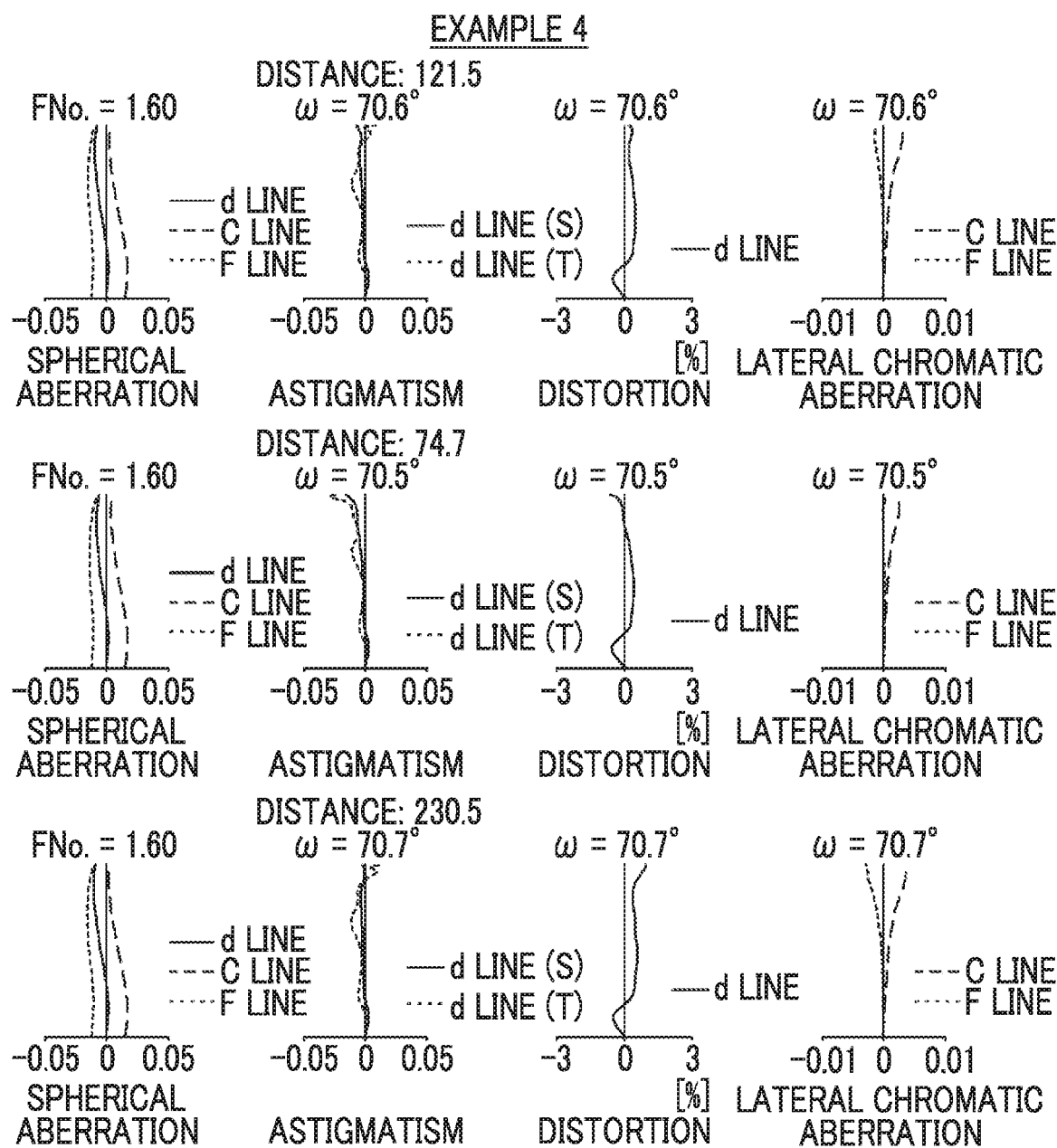
FIG. 16 is a diagram of aberrations of the imaging optical system of Example 4 of the present invention.

Further. Table 16 shows basic lens data of the imaging optical system of Example 4, Table 17 shows data about specification, Table 18 shows data about surface distances which are variable during focusing. Table 19 shows data about aspheric surface coefficients thereof, and FIG. 16 shows aberration diagrams. In addition, the projection conditions in FIG. 16 are as shown in the first stage (the projection distance 121.5), the second stage (the projection distance 74.7), and the third stage (the projection distance 230.5).

TABLE 16

Example 4 Lens Data (n, ν are based on the d line)

| Surface Number | Radius of Curvature | Surface Distance | n | ν |
|---|---|---|---|---|
| *1 | −3.6421 | 0.8500 | 1.53158 | 55.08 |
| *2 | −7.5271 | 3.1958 | | |
| 3 | 14.9668 | 0.3862 | 1.83400 | 37.16 |
| 4 | 4.5208 | 2.2377 | | |
| 5 | 27.6678 | 0.2833 | 1.83481 | 42.74 |
| 6 | 4.1883 | DD[6] | | |
| 7 | −5.7016 | 2.5745 | 1.60311 | 60.64 |
| 8 | −9.9946 | DD[8] | | |
| 9 | ∞ | 1.9310 | 1.48749 | 70.44 |
| 10 | −7.8255 | DD[10] | | |
| 11 | 14.1336 | 1.0876 | 1.80518 | 25.46 |
| 12 | 63.7000 | 11.0847 | | |
| 13 | 12.1735 | 3.1780 | 1.58313 | 59.37 |
| 14 | −6.7810 | 0.2704 | 1.84667 | 23.79 |
| 15 | −36.3213 | 0.0521 | | |
| 16 | 241.8881 | 0.2912 | 1.84667 | 23.79 |
| 17 | 6.9463 | 3.5729 | 1.48749 | 70.44 |
| 18 | −9.8058 | 0.1290 | | |
| *19 | −11.5060 | 1.0555 | 1.51007 | 56.24 |
| *20 | −6.1662 | 14.0530 | | |

TABLE 16-continued

Example 4 Lens Data (n, ν are based on the d line)

| Surface Number | Radius of Curvature | Surface Distance | n | ν |
|---|---|---|---|---|
| 21 | 34.8814 | 2.4001 | 1.51680 | 64.20 |
| 22 | −17.1497 | 9.5630 | | |
| *23 | −6.4031 | 1.0297 | 1.51007 | 56.24 |
| *24 | −6.0658 | 4.9928 | | |
| 25 | 26.7859 | 2.4816 | 1.83481 | 42.74 |
| 26 | −7.8875 | 0.2859 | 1.80518 | 25.46 |
| 27 | −18.9984 | 5.2529 | | |
| 28(Stop) | ∞ | 0.8961 | | |
| 29 | −4.3651 | 0.3088 | 1.84667 | 23.79 |
| 30 | 16.4918 | 0.0327 | | |
| 31 | 20.4710 | 1.8616 | 1.48749 | 70.44 |
| 32 | −5.5387 | 2.0118 | | |
| 33 | ∞ | 1.8111 | 1.48749 | 70.44 |
| 34 | −6.6604 | 0.0517 | | |
| 35 | 10.6558 | 1.2333 | 1.80518 | 25.46 |
| 36 | ∞ | 3.1304 | | |
| 37 | ∞ | 7.7488 | 1.51680 | 64.20 |
| 38 | ∞ | 0.0243 | | |

TABLE 17

Example 4 Specification (d line)

| | |
|---|---|
| |f| | 1.00 |
| Bf | 8.26 |
| FNo. | 1.60 |
| 2ω[°] | 141.2 |

TABLE 18

Example 4 Variable Surface Distance (Focusing)

| Distance | 121.5 | 74.7 | 230.5 | Infinity |
|---|---|---|---|---|
| DD[6] | 4.8243 | 4.5690 | 4.9988 | 5.1772 |
| DD[8] | 0.5245 | 0.7085 | 0.3987 | 0.2701 |
| DD[10] | 0.7814 | 0.8526 | 0.7327 | 0.6829 |

TABLE 19

Example 4 Aspheric Surface Coefficient

| Surface Number | 1 | 2 | 19 |
|---|---|---|---|
| KA | −5.45267068E−01 | −2.44407384E+00 | −5.00000016E+00 |
| A3 | 4.20141419E−02 | 5.09753449E−02 | 0.00000000E+00 |
| A4 | 3.83401905E−04 | −1.92007256E−02 | 1.10852154E−03 |
| A5 | −2.28614628E−03 | 1.20973831E−02 | −4.50830699E−04 |
| A6 | 2.37427024E−04 | −4.78431471E−03 | 1.94657228E−04 |
| A7 | 4.42291241E−05 | 8.60802613E−04 | −8.39304612E−05 |
| A8 | −8.06433115E−06 | −2.90247736E−05 | −9.27765144E−07 |
| A9 | −4.32899315E−07 | −1.19332641E−05 | 1.20275173E−05 |
| A10 | 1.45530628E−07 | 1.51307299E−06 | −2.55074590E−06 |
| A11 | −3.87954525E−13 | −8.26438332E−08 | −5.47904033E−07 |
| A12 | −1.51928270E−09 | 1.57518156E−08 | 2.13416439E−07 |
| A13 | 4.30566893E−11 | −9.85015115E−10 | 4.36721533E−09 |
| A14 | 9.33143810E−12 | −2.66810142E−10 | −6.57805459E−09 |
| A15 | −4.38632086E−13 | 5.00589447E−12 | 4.02988951E−10 |
| A16 | −3.09429936E−14 | 9.59285675E−12 | 2.83212644E−11 |
| A17 | 1.95530167E−15 | −1.41484921E−13 | −1.20815304E−11 |
| A18 | 3.73563462E−17 | 8.38120992E−14 | 2.61947711E−12 |
| A19 | −3.45619172E−18 | −2.04244762E−15 | 9.92740133E−14 |
| A20 | 2.85503388E−20 | 1.02789777E−17 | −4.12778187E−14 |

TABLE 19-continued

Example 4 Aspheric Surface Coefficient

| Surface Number | 20 | 23 | 24 |
|---|---|---|---|
| KA | 6.15197821E−01 | 1.00046050E+00 | 9.94515465E−01 |
| A3 | 0.00000000E+00 | 0.00000000E+00 | 0.00000000E+00 |
| A4 | 1.23860090E−03 | 1.02071784E−03 | 1.30505079E−03 |
| A5 | 8.99096051E−04 | 8.49464954E−04 | 9.89539082E−05 |
| A6 | −1.42654713E−04 | −1.48573100E−04 | 1.21055547E−04 |
| A7 | −1.77900437E−04 | −7.53650493E−05 | −2.28807666E−05 |
| A8 | 3.33425281E−05 | 2.68551349E−05 | −2.66169782E−05 |
| A9 | 2.49899934E−05 | 8.02283233E−08 | 6.21121524E−06 |
| A10 | −5.94909802E−06 | −1.69342095E−06 | 2.17984191E−06 |
| A11 | −2.07688874E−06 | 4.07440973E−07 | −6.57515232E−07 |
| A12 | 5.65815620E−07 | 1.82628814E−08 | −8.68801124E−08 |
| A13 | 1.02673047E−07 | −2.94419636E−08 | 3.60257401E−08 |
| A14 | −3.04767789E−08 | 2.88639069E−09 | 1.36306082E−09 |
| A15 | −2.99007331E−09 | 9.72706622E−10 | −1.08336006E−09 |
| A16 | 9.43255389E−10 | −1.53799029E−10 | 1.36704449E−11 |
| A17 | 4.74073764E−11 | −1.60860373E−11 | 1.69896615E−11 |
| A18 | −1.56538451E−11 | 3.17857109E−12 | −7.31897022E−13 |
| A19 | −3.15567786E−13 | 1.08214735E−13 | −1.08770119E−13 |
| A20 | 1.08066346E−13 | −2.47922821E−14 | 6.95076247E−15 |

Figure 9:
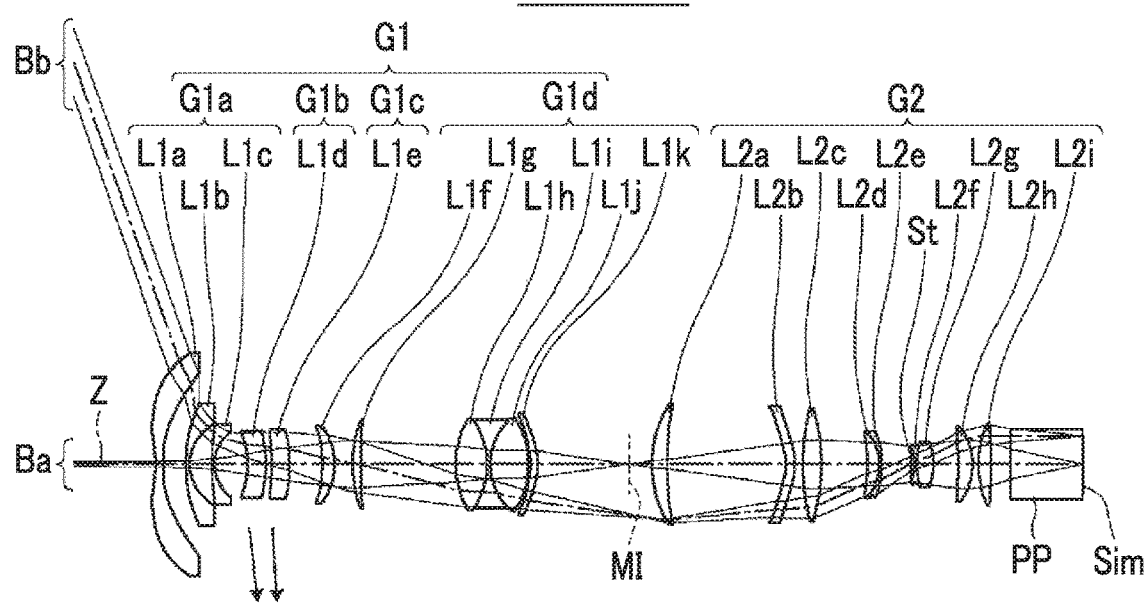
FIG. 9 is a cross-sectional view illustrating a lens configuration of an imaging optical system of Example 5 of the present invention.
Figure 10:
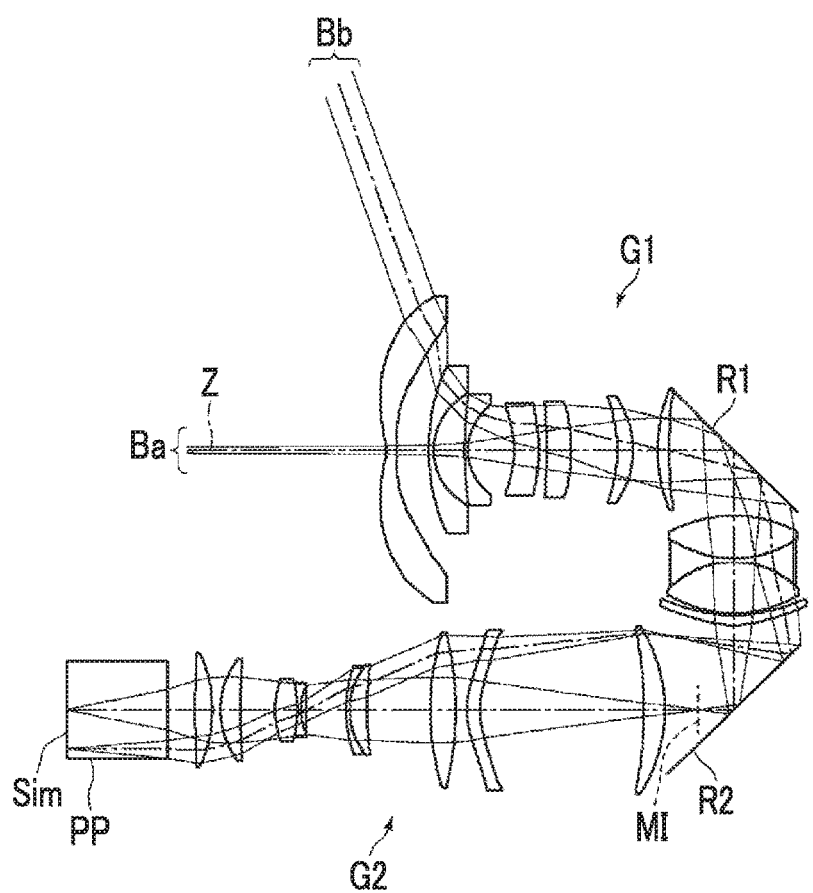
FIG. 10 is a cross-sectional view illustrating a configuration including mirrors of the imaging optical system according to Example 5 of the present invention.
Figure 17:
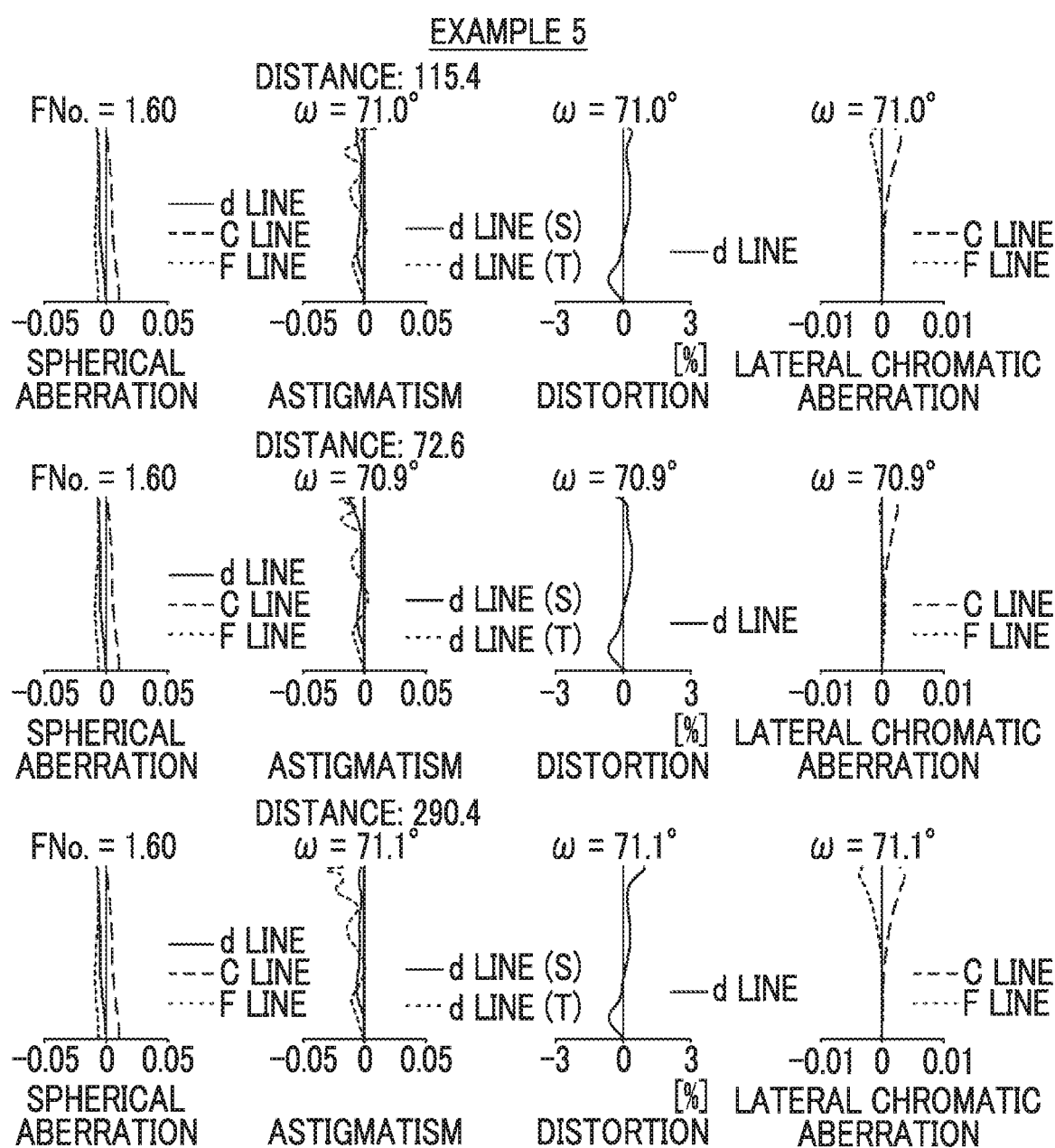
FIG. 17 is a diagram of aberrations of the imaging optical system of Example 5 of the present invention.

Next, an imaging optical system of Example 5 will be described. FIG. 9 is a cross-sectional view illustrating a lens configuration of the imaging optical system of Example 5, and FIG. 10 is a cross-sectional view illustrating a configuration including mirrors (optical axis deflection units R1 and R2) of the imaging optical system of Example 5. The group configuration of the imaging optical system of Example 5 is the same as that of Example 4 except that the second optical system G2 is composed of an aperture stop St and nine lenses L2a to L2i. Further, Table 20 shows basic lens data of the imaging optical system of Example 5, Table 21 shows data about specification, Table 22 shows data about surface distances which are variable during focusing, Table 23 shows data about aspheric surface coefficients thereof, and FIG. 17 shows aberration diagrams. In addition, the projection conditions in FIG. 17 are as shown in the first stage (the projection distance 115.4), the second stage (the projection distance 72.6), and the third stage (the projection distance 290.4).

TABLE 20

Example 5 Lens Data (n, ν are based on the d line)

| Surface Number | Radius of Curvature | Surface Distance | n | ν |
|---|---|---|---|---|
| *1 | −3.8885 | 0.7987 | 1.53158 | 55.08 |
| *2 | −8.8816 | 2.2268 | | |
| 3 | 15.5088 | 0.3875 | 1.83400 | 37.16 |
| 4 | 4.8233 | 2.2428 | | |
| 5 | 26.0296 | 0.2662 | 1.83481 | 42.72 |
| 6 | 4.1778 | DD[6] | | |
| 7 | −8.8193 | 1.8266 | 1.48749 | 70.44 |
| 8 | −16.0804 | DD[8] | | |
| 9 | −33.8148 | 1.7836 | 1.51742 | 52.43 |
| 10 | −13.0937 | DD[10] | | |
| 11 | −11.8630 | 1.1831 | 1.48749 | 70.44 |
| 12 | −6.9521 | 1.8152 | | |
| 13 | 12.7270 | 0.8291 | 1.84666 | 23.78 |
| 14 | 40.5743 | 9.6921 | | |
| 15 | 9.7552 | 3.1757 | 1.58913 | 61.13 |
| 16 | −8.3261 | 0.3242 | 1.84666 | 23.78 |
| 17 | 6.5102 | 3.9088 | 1.49700 | 81.61 |
| 18 | −8.8116 | 0.1724 | | |
| *19 | −8.3956 | 0.7523 | 1.51007 | 56.24 |
| *20 | −5.9365 | 11.4194 | | |
| 21 | 12.0150 | 1.5479 | 1.69680 | 55.53 |
| 22 | 32.1182 | 12.0457 | | |

TABLE 20-continued

Example 5 Lens Data (n, ν are based on the d line)

| Surface Number | Radius of Curvature | Surface Distance | n | ν |
|---|---|---|---|---|
| *23 | −6.5138 | 0.9398 | 1.51007 | 56.24 |
| *24 | −6.5221 | 0.8337 | | |
| 25 | 25.1191 | 1.8691 | 1.80400 | 46.58 |
| 26 | −20.4912 | 4.5564 | | |
| 27 | −21.7666 | 1.2682 | 1.77250 | 49.60 |
| 28 | −5.4219 | 0.2453 | 1.80518 | 25.46 |
| 29 | −10.1774 | 2.8978 | | |
| 30(Stop) | ∞ | 0.4420 | | |
| 31 | −4.2398 | 0.2322 | 1.80518 | 25.46 |
| 32 | 8.4210 | 0.0072 | | |
| 33 | 8.5436 | 1.6528 | 1.58913 | 61.13 |
| 34 | −6.6405 | 2.5302 | | |
| 35 | −46.7913 | 1.4655 | 1.58913 | 61.13 |
| 36 | −6.6102 | 0.5990 | | |
| 37 | 10.5707 | 1.2664 | 1.80518 | 25.46 |
| 38 | −103.7881 | 2.0282 | | |
| 39 | ∞ | 7.3345 | 1.51633 | 64.14 |
| 40 | ∞ | 0.0416 | | |

TABLE 21

Example 5 Specification (d line)

| | |
|---|---|
| \|f\| | 1.00 |
| Bf | 6.90 |
| FNo. | 1.60 |
| 2ω[°] | 142.0 |

TABLE 22

Example 5 Variable Surface Distance (Focusing)

| Distance | 115.4 | 72.6 | 290.4 | Infinity |
|---|---|---|---|---|
| DD[6] | 3.3693 | 2.9439 | 3.6971 | 4.0239 |
| DD[8] | 0.6212 | 0.8921 | 0.4125 | 0.2044 |
| DD[10] | 3.3579 | 3.5124 | 3.2388 | 3.1201 |

TABLE 23

Example 5 Aspheric Surface Coefficient

| Surface Number | 1 | 2 | 19 |
|---|---|---|---|
| KA | −5.93639718E−01 | −4.79844298E+00 | −3.53911919E+00 |
| A3 | 3.50248915E−02 | 4.40445347E−02 | 0.00000000E+00 |
| A4 | 8.53592613E−04 | −1.75381621E−02 | 3.38179556E−03 |
| A5 | −2.01566050E−03 | 1.00784844E−02 | −3.36939140E−03 |
| A6 | 2.05559867E−04 | −3.84304544E−03 | 1.46399759E−03 |
| A7 | 3.87876403E−05 | 6.87336749E−04 | 1.96183880E−04 |
| A8 | −7.25923346E−06 | −2.44544265E−05 | −3.54839169E−04 |
| A9 | −3.56743919E−07 | −9.21375840E−06 | 6.16180357E−05 |
| A10 | 1.33069529E−07 | 1.16108390E−06 | 2.68690393E−05 |
| A11 | −7.17815446E−10 | 4.82552122E−08 | −1.05598662E−05 |
| A12 | −1.39608216E−09 | 9.27995684E−09 | −6.67261700E−08 |
| A13 | 4.73631367E−11 | −8.47189477E−10 | 5.98536923E−07 |
| A14 | 8.56448041E−12 | −1.46928026E−10 | −8.40831384E−08 |
| A15 | −4.51233066E−13 | 5.05627843E−12 | −1.00050791E−08 |
| A16 | −2.82971595E−14 | 5.60927653E−12 | 3.64656754E−09 |
| A17 | 1.94741162E−15 | −8.50116053E−13 | −1.98429948E−10 |
| A18 | 3.45884315E−17 | 4.96941897E−14 | −3.98691856E−11 |
| A19 | −3.34981030E−18 | −1.12508757E−15 | 6.04565418E−12 |
| A20 | 2.26665277E−20 | 2.77975882E−18 | −2.34319660E−13 |

TABLE 23-continued

Example 5 Aspheric Surface Coefficient

| Surface Number | 20 | 23 | 24 |
|---|---|---|---|
| KA | −4.33005642E−01 | 1.00000000E+00 | 1.00000000E+00 |
| A3 | 0.00000000E+00 | 0.00000000E+00 | 0.00000000E+00 |
| A4 | 2.08193281E−03 | 1.87923261E−03 | 1.66196442E−03 |
| A5 | 1.18371780E−03 | 4.65383520E−04 | 3.13186943E−04 |
| A6 | −1.11031285E−03 | −2.04195895E−04 | −1.53017178E−04 |
| A7 | 2.04927482E−04 | 1.75145117E−05 | 2.25167300E−05 |
| A8 | 1.86861029E−04 | 2.19755962E−05 | 2.05826863E−05 |
| A9 | −8.58543909E−05 | −9.82243934E−06 | −9.85153713E−06 |
| A10 | −1.00991955E−05 | −4.95542464E−07 | −8.30906259E−07 |
| A11 | 1.04057601E−05 | 1.06074933E−06 | 1.14163854E−06 |
| A12 | −2.84574633E−07 | −8.28508032E−08 | −5.70453149E−08 |
| A13 | −6.34179618E−07 | −5.83960632E−08 | −6.56353533E−08 |
| A14 | 5.76759852E−08 | 7.79197342E−09 | 7.05892947E−09 |
| A15 | 2.11405826E−08 | 1.78300238E−09 | 2.02813918E−09 |
| A16 | −2.69581250E−09 | −2.94595347E−10 | −2.83670021E−10 |
| A17 | −3.67782688E−10 | −2.85573940E−11 | −3.21802836E−11 |
| A18 | 5.58366815E−11 | 5.33517499E−12 | 5.19113419E−12 |
| A19 | 2.61387272E−12 | 1.86919431E−13 | 2.06060826E−13 |
| A20 | −4.43344625E−13 | −3.80344535E−14 | −3.65475188E−14 |

Figure 11:
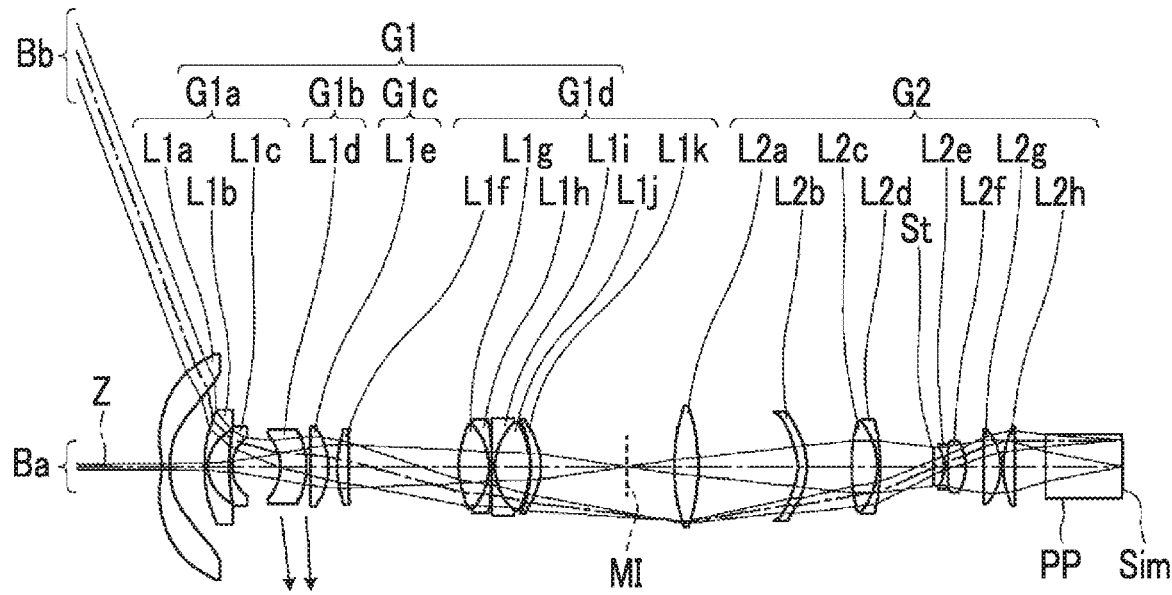
FIG. 11 is a cross-sectional view illustrating a lens configuration of an imaging optical system of Example 6 of the present invention.
Figure 12:
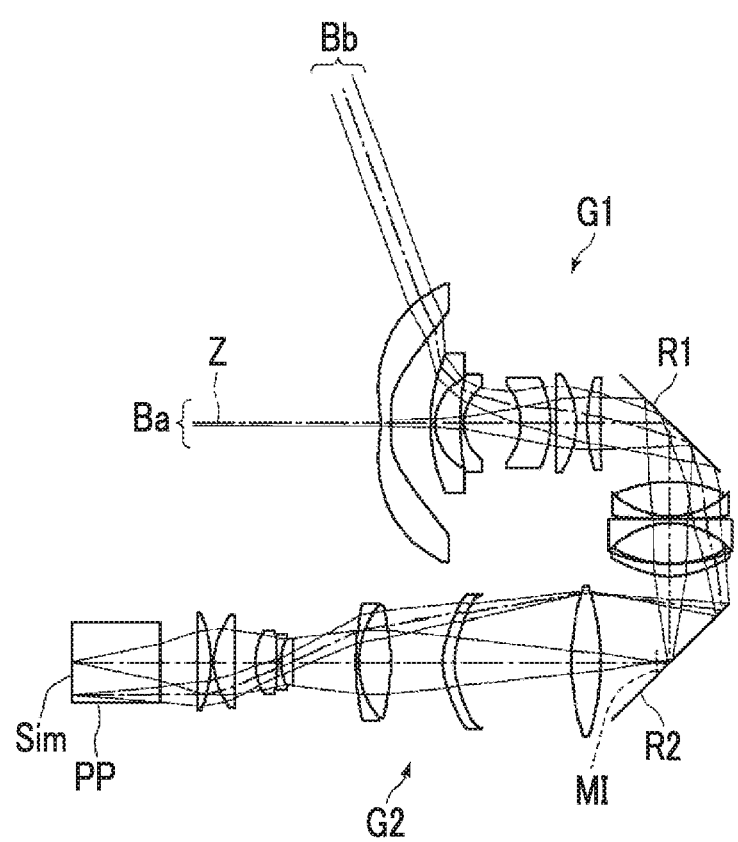
FIG. 12 is a cross-sectional view illustrating a configuration including mirrors of the imaging optical system according to Example 6 of the present invention.

Next, an imaging optical system of Example 6 will be described. FIG. 11 is a cross-sectional view illustrating a lens configuration of the imaging optical system of Example 6, and FIG. 12 is a cross-sectional view illustrating a configuration including mirrors (optical axis deflection units R1 and R2) of the imaging optical system of Example 6. The group configuration of the imaging optical system of Example 6 is the same as that of the imaging optical system of Example 4.

Figure 18:
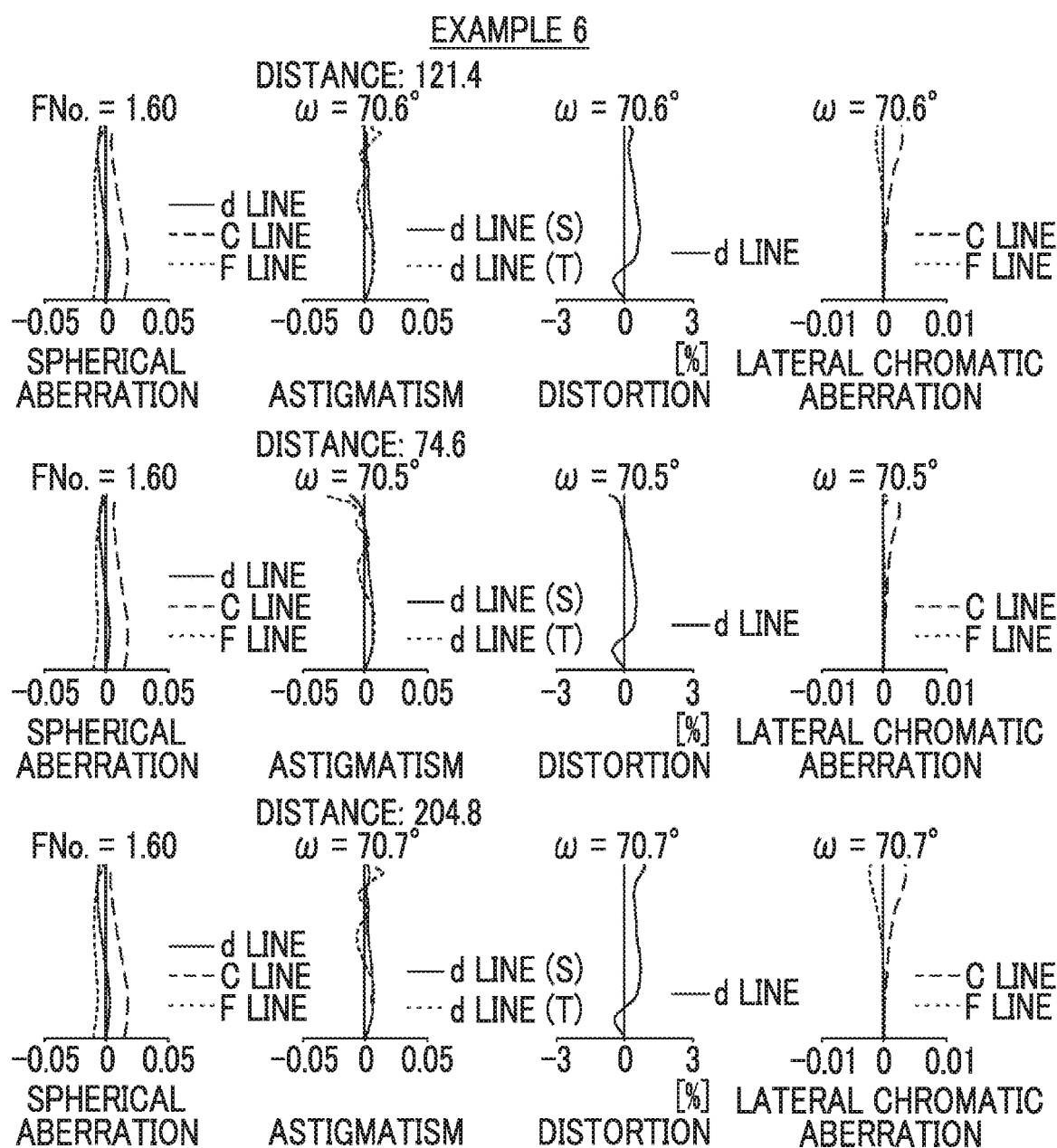
FIG. 18 is a diagram of aberrations of the imaging optical system of Example 6 of the present invention.

Further, Table 24 shows basic lens data of the imaging optical system of Example 6. Table 25 shows data about specification, Table 26 shows data about surface distances which are variable during focusing, Table 27 shows data about aspheric surface coefficients thereof, and FIG. 18 shows aberration diagrams. In addition, the projection conditions in FIG. 18 are as shown in the first stage (the projection distance 121.4), the second stage (the projection distance 74.6), and the third stage (the projection distance 204.8).

TABLE 24

Example 6 Lens Data (n, ν are based on the d line)

| Surface Number | Radius of Curvature | Surface Distance | n | ν |
|---|---|---|---|---|
| *1 | −3.8571 | 0.8488 | 1.53158 | 55.08 |
| *2 | −8.2981 | 3.4286 | | |
| 3 | 15.6205 | 0.3858 | 1.83400 | 37.16 |
| 4 | 4.4969 | 2.1774 | | |
| 5 | 24.2091 | 0.2829 | 1.83481 | 42.74 |
| 6 | 4.2319 | DD[6] | | |
| 7 | −5.5308 | 2.5515 | 1.60311 | 60.64 |
| 8 | −9.5531 | DD[8] | | |
| 9 | ∞ | 1.7413 | 1.48749 | 70.44 |
| 10 | −7.8461 | DD[10] | | |
| 11 | 14.6990 | 1.1009 | 1.80518 | 25.46 |
| 12 | 75.1118 | 11.2992 | | |
| 13 | 11.5142 | 3.0531 | 1.58313 | 59.37 |
| 14 | −7.0887 | 0.2701 | 1.84667 | 23.79 |
| 15 | −35.2560 | 0.0514 | | |
| 16 | ∞ | 0.2906 | 1.84667 | 23.79 |
| 17 | 6.9385 | 3.5598 | 1.48749 | 70.44 |
| 18 | −10.0146 | 0.0772 | | |
| *19 | −11.6678 | 1.0546 | 1.51007 | 56.24 |
| *20 | −6.1750 | 13.5729 | | |
| 21 | 21.7259 | 2.4898 | 1.51680 | 64.20 |
| 22 | −21.7259 | 10.1185 | | |

TABLE 24-continued

Example 6 Lens Data (n, ν are based on the d line)

| Surface Number | Radius of Curvature | Surface Distance | n | ν |
|---|---|---|---|---|
| *23 | −6.0808 | 0.9774 | 1.51007 | 56.24 |
| *24 | −6.2670 | 4.5217 | | |
| 25 | 20.2149 | 2.6287 | 1.83481 | 42.74 |
| 26 | −8.1700 | 0.2855 | 1.80518 | 25.46 |
| 27 | −22.1437 | 5.3859 | | |
| 28(Stop) | ∞ | 1.0623 | | |
| 29 | −4.3426 | 0.3087 | 1.84667 | 23.79 |
| 30 | 16.4776 | 0.0183 | | |
| 31 | 18.2604 | 1.8673 | 1.48749 | 70.44 |
| 32 | −5.6543 | 1.7876 | | |
| 33 | ∞ | 1.7619 | 1.48749 | 70.44 |
| 34 | −6.6820 | 0.2598 | | |
| 35 | 10.3973 | 1.2243 | 1.80518 | 25.46 |
| 36 | ∞ | 3.1269 | | |
| 37 | ∞ | 7.7402 | 1.51680 | 64.20 |
| 38 | ∞ | 0.0429 | | |

TABLE 25

Example 6 Specification (d line)

| | |
|---|---|
| |f| | 1.00 |
| Bf | 8.26 |
| FNo. | 1.60 |
| 2ω[°] | 141.2 |

TABLE 26

Example 6 Variable Surface Distance (Focusing)

| Distance | 121.4 | 74.6 | 204.8 | infinity |
|---|---|---|---|---|
| DD[6] | 4.9124 | 4.6454 | 5.0629 | 5.2562 |
| DD[8] | 0.5098 | 0.7017 | 0.4016 | 0.2627 |
| DD[10] | 0.9488 | 1.0239 | 0.9065 | 0.8521 |

TABLE 27

Example 6 Aspheric Surface Coefficient

| Surface Number | 1 | 2 | 19 |
|---|---|---|---|
| KA | −5.34602989E−01 | −2.99394974E+00 | −3.18695525E+00 |
| A3 | 4.41588815E−02 | 5.37701658E−02 | 0.00000000E+00 |
| A4 | −4.44842172E−04 | −2.00987958E−02 | 6.12198632E−04 |
| A5 | −2.35716150E−03 | 1.25065914E−02 | −1.44395234E−04 |
| A6 | 2.82162329E−04 | −5.16554571E−03 | 2.81201916E−04 |
| A7 | 4.52974801E−05 | 9.72821213E−04 | −1.51554354E−04 |
| A8 | −9.31391910E−06 | −3.34967083E−05 | −2.49014766E−06 |
| A9 | −4.39796856E−07 | −1.44651319E−05 | 2.03060244E−05 |
| A10 | 1.68438416E−07 | 1.77491054E−06 | −4.33605781E−06 |
| A11 | −1.26291212E−10 | −7.30888324E−08 | −9.64760510E−07 |
| A12 | −1.79919532E−09 | 1.73442401E−08 | 4.58043064E−07 |
| A13 | 4.67203905E−11 | −1.48625471E−09 | 1.98820490E−09 |
| A14 | 1.15610664E−11 | −3.04207065E−10 | −2.03535932E−08 |
| A15 | −4.79360450E−13 | 8.88022477E−12 | 1.24116290E−09 |
| A16 | −4.17565489E−14 | 1.16943716E−11 | 4.36306991E−10 |
| A17 | 2.17631331E−15 | −1.78574694E−12 | −3.33503826E−11 |
| A18 | 6.49952122E−17 | 1.07248437E−13 | −4.60632068E−12 |
| A19 | −3.93247558E−18 | −2.59848620E−15 | 2.10731427E−13 |
| A20 | 2.82311452E−21 | 1.14324796E−17 | 2.85766740E−14 |

| Surface Number | 20 | 23 | 24 |
|---|---|---|---|
| KA | 6.40578232E−01 | 1.01628889E+00 | 1.02166325E+00 |
| A3 | 0.00000000E+00 | 0.00000000E+00 | 0.00000000E+00 |
| A4 | 1.63126964E−03 | 1.69404176E−03 | 1.71954692E−03 |
| A5 | 5.00272556E−04 | 9.92804167E−04 | 4.78048827E−05 |
| A6 | −2.19593632E−04 | −4.81900268E−04 | 1.06326334E−04 |
| A7 | 1.68146572E−06 | 2.13778804E−05 | −4.02755832E−05 |
| A8 | 2.28584774E−05 | 5.50790405E−05 | −2.13249353E−05 |
| A9 | −6.02039291E−06 | −1.52329771E−05 | 1.16040200E−05 |
| A10 | −1.74260176E−06 | −2.31912652E−06 | 4.11600396E−07 |
| A11 | 7.36259753E−07 | 1.39996322E−06 | −1.14420462E−06 |
| A12 | 7.22294587E−08 | −7.54682221E−09 | 1.07456810E−07 |
| A13 | −4.19737968E−08 | −6.13715799E−08 | 5.61850760E−08 |
| A14 | −1.34916380E−09 | 4.03631136E−09 | −8.99347678E−09 |
| A15 | 1.26493150E−09 | 1.43925402E−09 | −1.48350867E−09 |
| A16 | 2.14937787E−12 | −1.42773952E−10 | 3.09111492E−10 |
| A17 | −1.95520674E−11 | −1.72173569E−11 | 2.00984507E−11 |
| A18 | 2.85673724E−13 | 2.14032043E−12 | −5.09049610E−12 |
| A19 | 1.22706849E−13 | 8.13185348E−14 | −1.09210877E−13 |
| A20 | −3.06109276E−15 | −1.24023377E−14 | 3.31189761E−14 |

Table 28 shows values corresponding to Conditional Expressions (1) to (3) of the imaging optical systems of Examples 1 to 6. It should be noted that, in the above-mentioned examples, the d line is set as the reference wavelength, and the values shown in Table 28 are values at the reference wavelength.

TABLE 28

| Expression Number | Conditional Expression | Example 1 | Example 2 | Example 3 |
|---|---|---|---|---|
| (1) | u1-u2 | 0.032 | −0.120 | 0.039 |
| (2) | ΔBf/Δtas | 0.124 | 0.126 | 0.128 |
| (3) | |hfmax|/|hmax| | 0.229 | 0.284 | 0.189 |

| Expression Number | Conditional Expression | Example 4 | Example 5 | Example 6 |
|---|---|---|---|---|
| (1) | u1-u2 | 0.040 | 0.028 | 0.042 |
| (2) | ΔBf/Δtas | 0.126 | 0.114 | 0.125 |
| (3) | |hfmax|/|hmax| | 0.175 | 0.234 | 0.183 |

As can be seen from the above-mentioned data, all the imaging optical systems of Examples 1 to 6 satisfy Conditional Expressions (1) to (3), and are imaging optical systems each of which has a total angle of view equal to or greater than 130° and has a wide angle and has performance which less changes in a case where the projection distance changes.

Figure 19:
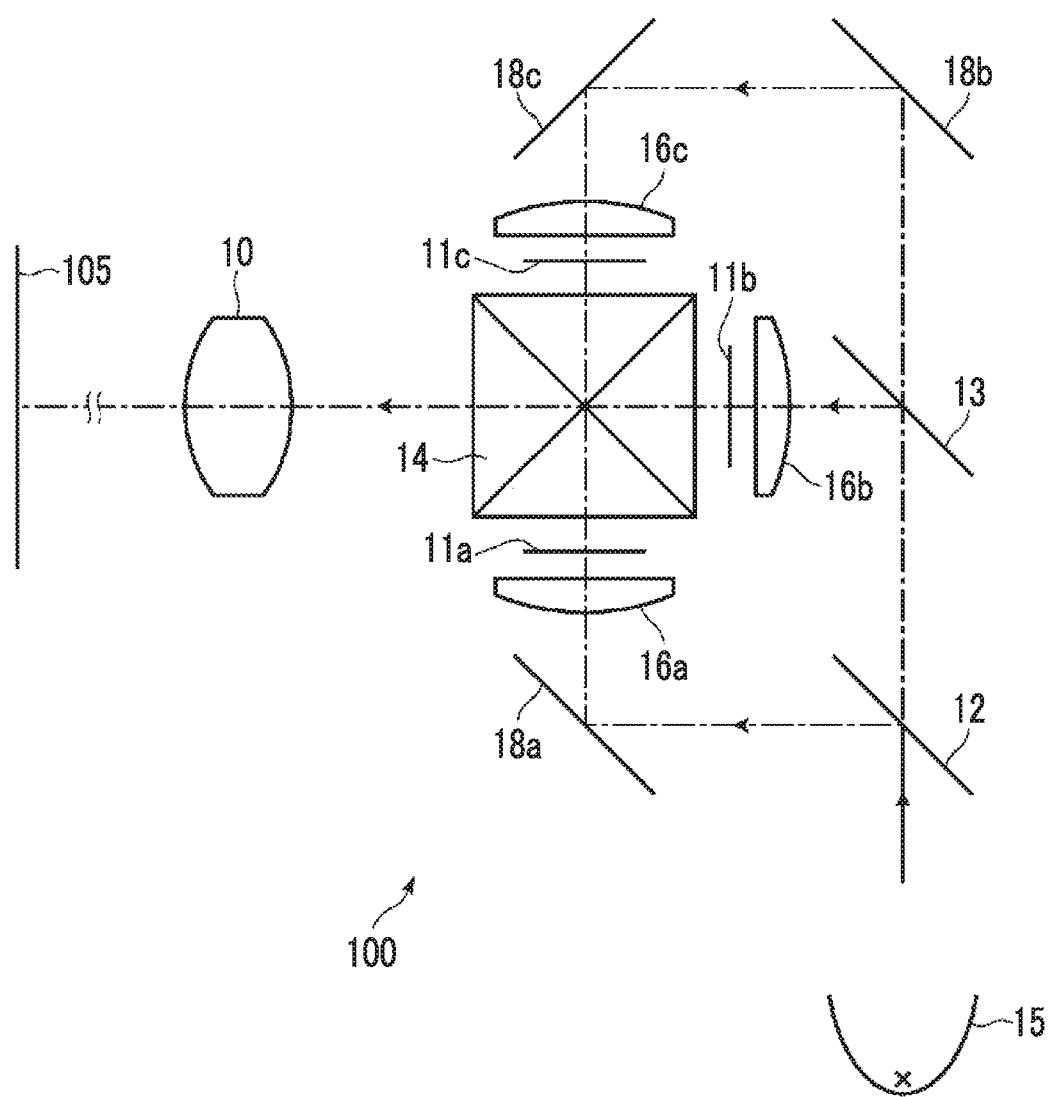
FIG. 19 is a schematic configuration diagram of a projection display device according to an embodiment of the present invention.

Next, a projection display device according to an embodiment of the present invention will be described. FIG. 19 is a schematic configuration diagram of the projection display device according to the above-mentioned embodiment of the present invention. The projection display device 100 shown in FIG. 19 has an imaging optical system 10 according to the above-mentioned embodiment of the present invention, a light source 15, transmissive display elements 11a to 11c as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical path. In FIG. 19, the imaging optical system 10 is schematically illustrated. Further, an integrator is disposed between the light source 15 and the dichroic mirror 12, but illustration thereof is omitted in FIG. 19.

White light originated from the light source 15 is separated into rays with three colors (G light, B light, R light) through the dichroic mirrors 12 and 13. Thereafter, the rays respectively pass through the condenser lenses 16a to 16c, are incident into and optically modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the light optically modulated through the transmissive display elements 11a to 11c, onto a screen 105.

Figure 20:
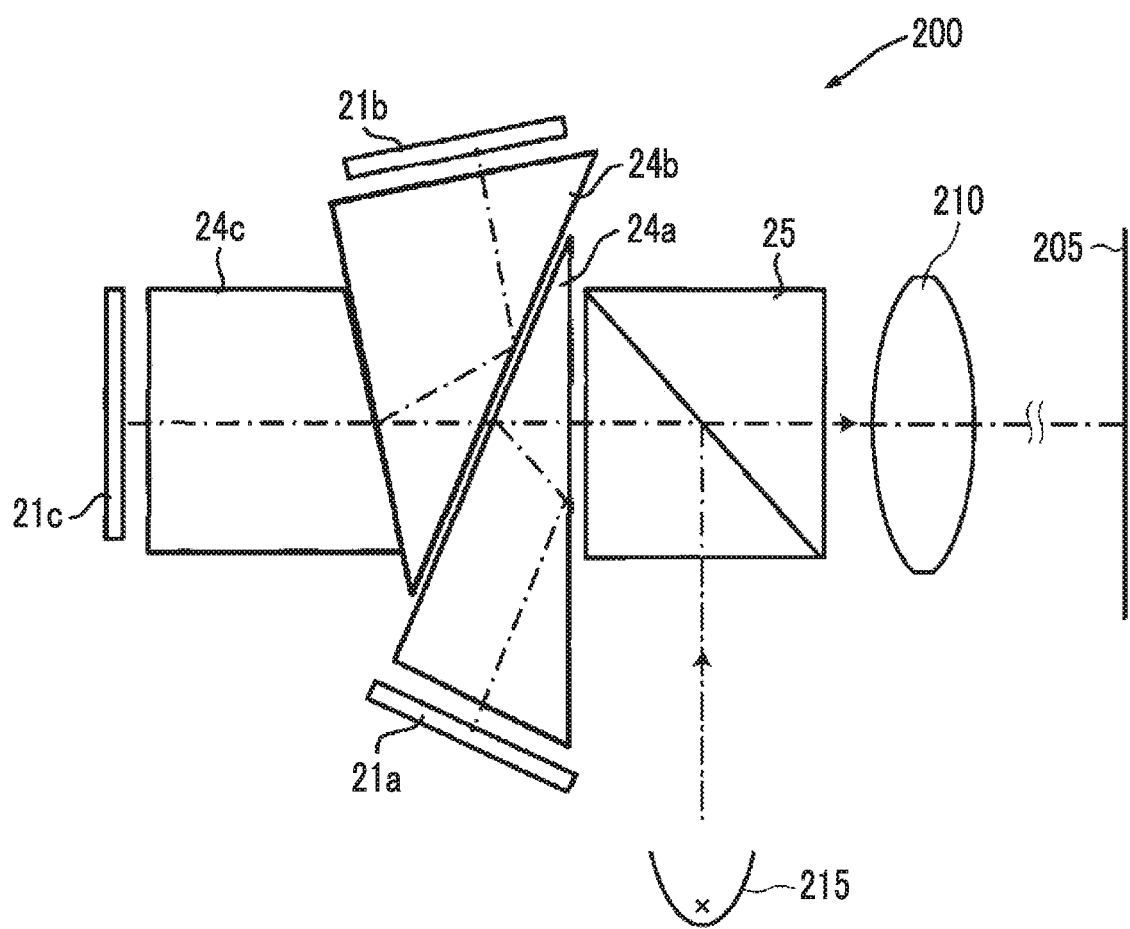
FIG. 20 is a schematic configuration diagram of a projection display device according to another embodiment of the present invention.

FIG. 20 is a schematic configuration diagram of a projection display device according to another embodiment of the present invention. The projection display device 200 shown in FIG. 20 has an imaging optical system 210 according to the above-mentioned embodiment of the present invention, a light source 215, DMD elements 21a to 21c as light valves corresponding to respective color light rays, total internal reflection (TIR) prisms 24a to 24c for color separation and color synthesis, and a polarization separating prism 25 that separates illumination light and projection light. In FIG. 20, the imaging optical system 210 is schematically illustrated. Further, an integrator is disposed between the light source 215 and the polarization separating prism 25, but illustration thereof is omitted in FIG. 20.

White light originated from the light source 215 is reflected on a reflective surface inside the polarization separating prism 25, and is separated into rays with three colors (G light, B light, R light) through the TIR prisms 24a to 24c. The separated rays with the respective colors are respectively incident into and optically modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the light optically modulated through the DMD elements 21a to 21c, onto a screen 205.

Figure 21:
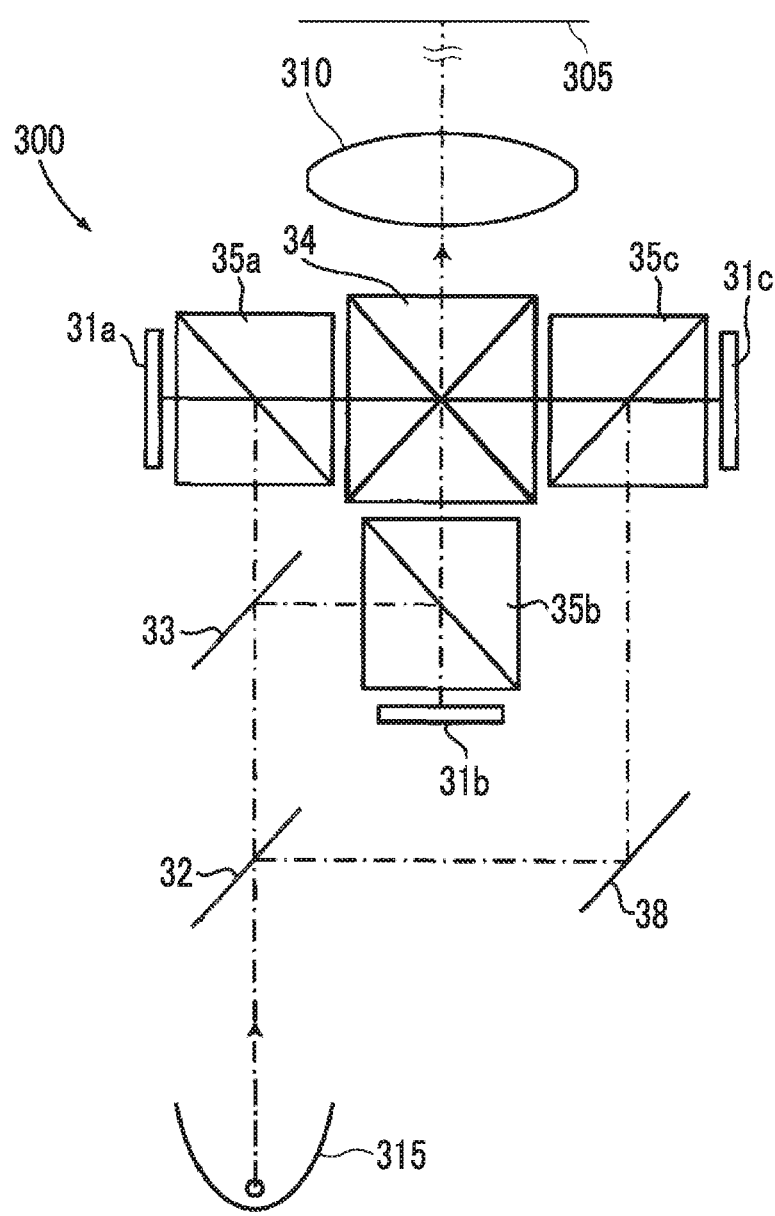
FIG. 21 is a schematic configuration diagram of a projection display device according to still another embodiment of the present invention.

FIG. 21 is a schematic configuration diagram of a projection display device according to still another embodiment of the present invention. The projection display device 300 shown in FIG. 21 has an imaging optical system 310 according to the above-mentioned embodiment of the present invention, a light source 315, reflective display elements 31a to 31c as light valves corresponding to respective color light rays, dichroic mirrors 32 and 33 for color separation, a cross dichroic prism 34 for color synthesis, a total reflection mirror 38 for deflecting the optical path, and polarization separating prisms 35a to 35c. In FIG. 21, the imaging optical system 310 is schematically illustrated. Further, an integrator is disposed between the light source 315 and the dichroic mirror 32, but illustration thereof is omitted in FIG. 21.

White light originated from the light source 315 is separated into rays with three colors (G light, B light, R light) through the dichroic mirrors 32 and 33. The separated rays with the respective colors respectively pass through the polarization separating prisms 35a to 35c, are incident into and optically modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the light optically modulated through the reflective display elements 31a to 31c, onto a screen 305.

Figure 22:
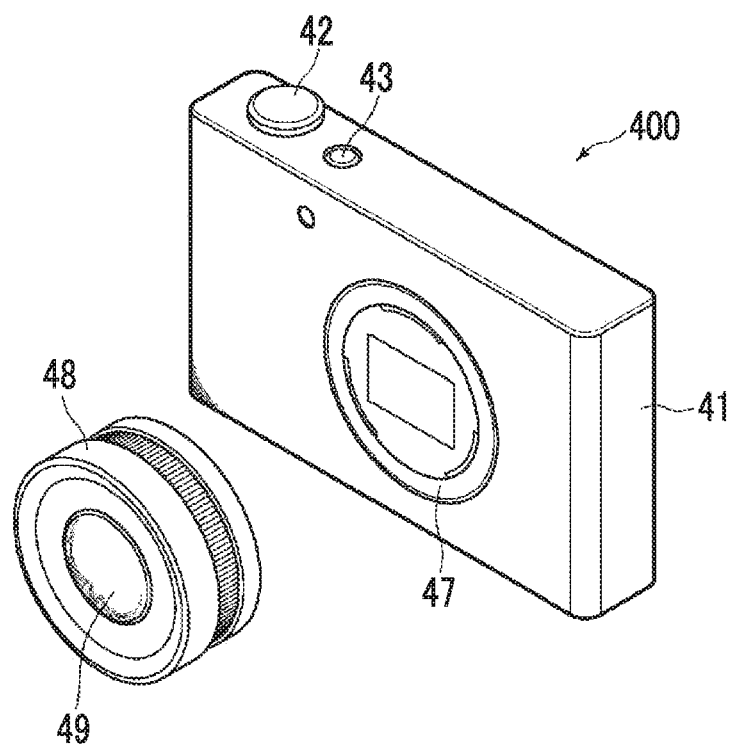
FIG. 22 is a perspective view of the front side of an imaging apparatus according to an embodiment of the present invention.
Figure 23:
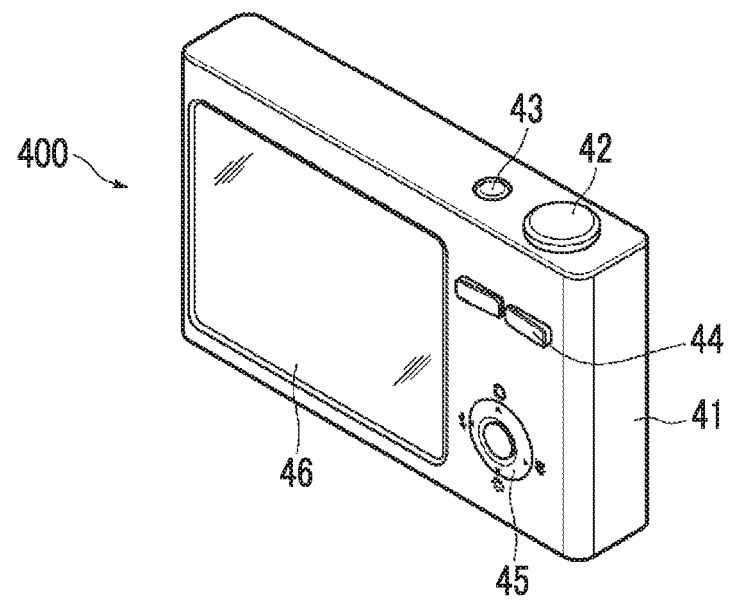
FIG. 23 is a perspective view of the rear side of the imaging apparatus shown in FIG. 22.

FIGS. 22 and 23 are external views of a camera 400 which is the imaging apparatus according to the above-mentioned embodiment of the present invention. FIG. 22 is a perspective view of the camera 400 viewed from the front side, and FIG. 23 is a perspective view of the camera 400 viewed from the rear side. The camera 400 is a single-lens digital camera on which an interchangeable lens 48 is detachably mounted and which has no reflex finder. The interchangeable lens 48 is configured such that an imaging optical system 49 as the optical system according to the above-mentioned embodiment of the present invention is housed in a lens barrel.

The camera 400) comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image and an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a storage medium, and the like. The imaging element (not shown in the drawing) such as a charge coupled device (CCD) or a complementary metal oxide semiconductor (CMOS) outputs a captured image signal based on a subject image which is formed through the interchangeable lens 48. The signal processing circuit generates an image through processing of the captured image signal which is output from the imaging element. The storage medium stores the generated image. The camera 400 is able to capture a still image or a moving image by pressing the shutter button 42, and is able to store image data, which is obtained through imaging, in the storage medium.

The present invention has been hitherto described through embodiments and examples, but the imaging optical system of the present invention is not limited to the above-mentioned embodiments and examples, and may be modified into various forms. For example, the radius of curvature, the surface distance, the refractive index, and the Abbe number of each lens may be appropriately changed.

Further, the projection display device of the present invention is not limited to that of the above-mentioned configuration. For example, the used light valve and the optical member used in separation or synthesis of rays are not limited to those of the above-mentioned configuration, and may be modified into various forms. The light valve is not limited to an aspect in which light from a light source is spatially modulated by image display elements, and is output as an optical image based on image data, and may have an aspect in which light that is output by self-luminous image display elements is output as an optical image based on image data. Examples of self-luminous image display elements include image display elements in which light emitting elements such as light emitting diodes (LEDs) or organic light emitting diodes (OLEDs) are arrayed two-dimensionally.

Further, the imaging apparatus of the present invention is also not limited to the above-mentioned configurations. For example, the present invention may be applied to a single-lens reflex camera, a film camera, a video camera, and the like.

Explanation of References 10, 210, 310: imaging optical system
11a to 11c: transmissive display element
12, 13, 32, 33: dichroic mirror
14, 34: cross dichroic prism
15, 215, 315: light source
16a to 16c: condenser lens
18a to 18c, 38: total reflection mirror
21a to 21c: DMD element
24a to 24c: TIR prism
25, 35a to 35c: polarization separating prism
31a to 31c: reflective display element
41: camera body
42: shutter button
43: power button
44, 45: operation section
46: display section
47: mount
48: interchangeable lens
49: imaging optical system
100, 200, 300: projection display device
105, 205, 305: screen
400: camera
Ba: on-axis rays
Bb: rays with maximum angle of view
G1: first optical system
G1a: first-a lens group
G1b: first-b lens group
G1c: first-c lens group
G1d: first-d lens group
G2: second optical system
G2a: second-a lens group
G2b: second-b lens group
G2c: second-c lens group
G2d: second-d lens group
G2e: second-e lens group
G2f: second-f lens group
L1a to L2k: lens
MI: intermediate image
PP: optical member
R1: first optical axis deflection unit
R2: second optical axis deflection unit
Sim: image display surface
Ta: on-axis rays at telephoto end
Tb: rays with the maximum angle of view at telephoto end
Wa: on-axis rays at wide-angle end
Wb: rays with the maximum angle of view at wide-angle end
Z: optical axis

What is claimed is:

1. An imaging optical system consisting of, in order from a magnification side:
    a first optical system that forms an intermediate image on a position conjugate to a magnification side imaging surface; and
    a second optical system that re-forms the intermediate image on a reduction side imaging surface,
    wherein the first optical system includes at least two focusing lens groups that move with different loci during focusing,
    wherein in a case where paraxial ray tracing is performed in a state where a focal length of a whole system is normalized to 1 and rays parallel to an optical axis at a height h of 1 are made incident from a reduction side, assuming that
        an inclination angle of the rays incident into the focusing lens group closest to the magnification side with respect to the optical axis is u1,
        an inclination angle of the rays emitted from the focusing lens group closest to the magnification side with respect to the optical axis is u2, and
        units of a value of u1 and a value of u2 are radian,
    Conditional Expression (1) is satisfied, $$-0.3 < u1 - u2 < 0.3 \quad (1)$$

wherein in a case where paraxial ray tracing is performed in a state where the focal length of the whole system is normalized to 1 and the rays parallel to the optical axis at the height h of 1 are made incident from the reduction side, assuming that
        a maximum value of heights of the rays in the focusing lens group is |hfmax|, and
        a maximum value of heights of the rays in the whole system is |hmax|,
    Conditional Expression (3) is satisfied, $$0.05 < |hfmax|/|hmax| < 0.5 \quad (3)$$

2. The imaging optical system according to claim 1, wherein assuming that
    the focal length of the whole system is f,
    an amount of change in back focal length in a case where only the focusing lens group closest to the magnification side moves by |f|/100 toward the reduction side is ΔBf, and
    an amount of change in imaging position of a principal ray on a tangential image plane at a maximum angle of view in a direction of the optical axis in a case where only the focusing lens group closest to the magnification side moves by |f|/100 toward the reduction side is Δtas,
    Conditional Expression (2) is satisfied $$-0.5 < \Delta Bf/\Delta tas < 0.5 \quad (2)$$

3. The imaging optical system according to claim 1, wherein the first optical system includes only two focusing lens groups.

4. The imaging optical system according to claim 1, wherein a ratio of an amount of movement of each of all the focusing lens groups included in the first optical system is constant.

5. The imaging optical system according to claim 1, further comprising
two optical axis deflection units that deflect the optical axis by 90° on a reflective surface.

6. The imaging optical system according to claim 1, wherein the second optical system includes a zoom lens group that moves during zooming.

7. The imaging optical system according to claim 6, wherein the second optical system includes at least three zoom lens groups that move with different loci during zooming and a lens group that has a positive refractive power and that remains stationary on the reduction side during zooming.

8. The imaging optical system according to claim 1, wherein Conditional Expression (1-1) is satisfied $$-0.2 < u1 - u2 < 0.2 \tag{1-1}$$

9. The imaging optical system according to claim 2, wherein Conditional Expression (2-1) is satisfied $$-0.25 < \Delta Bf/\Delta tas < 0.25 \tag{2-1}$$

10. The imaging optical system according to claim 2, wherein Conditional Expression (2-2) is satisfied $$0 < \Delta Bf/\Delta tas < 0.2 \tag{2-2}$$

11. The imaging optical system according to claim 1, wherein Conditional Expression (3-1) is satisfied $$0.1 < |hf\max|/|h\max| < 0.4 \tag{3-1}$$

12. A projection display device comprising:
a light valve from which an optical image is output based on image data; and
the imaging optical system according to claim 1,
wherein the imaging optical system projects the optical image, which is output from the light valve, onto a screen.

13. An imaging apparatus comprising the imaging optical system according to claim 1.

* * * * *